(12) United States Patent
Randhava et al.

(10) Patent No.: US 8,679,439 B2
(45) Date of Patent: Mar. 25, 2014

(54) PROCESS FOR PRODUCING AMMONIA FROM BIOMASS

(75) Inventors: Sarabjit S. Randhava, Evanston, IL (US); Surjit S. Randhava, Evanston, IL (US); Todd Harvey, Schaumburg, IL (US); Richard L. Kao, Northbrook, IL (US)

(73) Assignee: Syngest, Inc., San Francisco, CA (US)

( * ) Notice: Subject to any disclaimer, the term of this patent is extended or adjusted under 35 U.S.C. 154(b) by 942 days.

(21) Appl. No.: 12/543,484

(22) Filed: Aug. 18, 2009

(65) Prior Publication Data
US 2010/0040527 A1 Feb. 18, 2010

Related U.S. Application Data

(60) Provisional application No. 61/089,883, filed on Aug. 18, 2008, provisional application No. 61/173,970, filed on Apr. 29, 2009.

(51) Int. Cl.
*C01C 1/04* (2006.01)
*C01B 3/32* (2006.01)

(52) U.S. Cl.
USPC ........... 423/359; 48/197 R; 252/373; 423/362

(58) Field of Classification Search
USPC .............. 423/359, 644, 648.1, 650, 651, 362, 423/363; 422/148; 48/197 R; 252/373
See application file for complete search history.

(56) References Cited

U.S. PATENT DOCUMENTS

| | | | |
|---|---|---|---|
| 8,297,542 B2 * | 10/2012 | Rappas et al. | 241/23 |
| 2002/0127165 A1 * | 9/2002 | Kindig et al. | 423/359 |
| 2004/0265158 A1 * | 12/2004 | Boyapati et al. | 417/572 |
| 2006/0228284 A1 | 10/2006 | Schmidt | |
| 2008/0019903 A1 | 1/2008 | Wegner | |
| 2008/0171899 A1 * | 7/2008 | Pulkrabek et al. | 585/240 |
| 2008/0176298 A1 | 7/2008 | Randhava et al. | |
| 2009/0221721 A1 * | 9/2009 | Norbeck et al. | 518/704 |

FOREIGN PATENT DOCUMENTS

| | | |
|---|---|---|
| CN | 1435369 A | 8/2003 |
| CN | 1528656 A | 9/2004 |
| CN | 1997590 A | 7/2007 |
| JP | 2002-121571 | 4/2002 |
| WO | WO 2008068596 A2 * | 6/2008 |

OTHER PUBLICATIONS

Swierczynski et al "Steam reforming of tar from a biomass gasification process over Ni/olivine catalyst using toluene as a model compound" 2007, Applied Catalysis B, Environmental 74. 211-222.*
Cryogenic storage tanks, http://oxygenplants.com/cryogenic-storage-tanks.html, Date N/A. Cryogenic Storage Tanks Liquid Oxygen Plants Manufacturers.*

(Continued)

*Primary Examiner* — Wayne Langel
*Assistant Examiner* — Syed Iqbal
(74) *Attorney, Agent, or Firm* — Wilson Sonsini Goodrich & Rosati

(57) ABSTRACT

This invention provides a process for making ammonia from biomass. The biomass may be first reacted with oxygen and steam to generate a biosyngas comprising hydrogen ($H_2$) and carbon monoxide (CO) as the active components. The gasification step may be regulated to reduce the amount of methane in the biosyngas that may leave the gasifier.

26 Claims, 11 Drawing Sheets

(56) References Cited

OTHER PUBLICATIONS

International search report dated Mar. 18, 2010 for PCT Application No. US2009/54234.

Chen, et al. Review on Hydrogen-Rich Gas Production From Biomass. Acta Energiae Solaris Sinica. 2006; 27(12):1276-1284 (in Chinese with Engish abstract).

* cited by examiner

Gas Molar Flows as a Function of Oxygen Feed Rate

PROCESS FOR PRODUCING AMMONIA FROM BIOMASS

CROSS-REFERENCE

The application claims the benefit of U.S. Provisional Application No. 61/089,883, filed Aug. 18, 2008, and U.S. Provisional Application No. 61/173,970, filed Apr. 29, 2009, which are hereby incorporated herein by reference in their entirety.

BACKGROUND OF THE INVENTION

Bioammonia may be a 100% natural fertilizer that can be made from biomass and oxygen obtained from air. More than 1.5% of the world's total energy consumption is currently used for ammonia production. This number is predicted to increase to 3% because of growing demands in India and China.

Production of ammonia from non-fossil fuels can have a significant impact on global warming by reducing the amount of natural gas and other fossil fuels that are being used for this purpose. High margins may allow a benefit from the invention, even when there is price competition for cellulosic feedstocks. Fertilizer is a high profit opportunity for the use of cellulosic feedstocks, and the invention may allow favorable competition against all other cellulosic businesses.

Fertilizer demand is growing worldwide, while supplies are constrained. The price of natural gas drives the price of ammonia. In the U.S. natural gas supplies are limited and our country imports a significant amount of liquefied natural gas (LNG), which in turn creates an even larger upward pressure on ammonia prices.

The production of bioammonia makes local sense. The product can make uses of local renewable resources, local production facilities, and local dissemination of ammonia into local markets, thereby creating regional agricultural economic benefits. Because the product can be manufactured from biomass, bioammonia can be considered to be an organic fertilizer. Bioammonia may be 100% recyclable and 100% environmentally clean given the fact that it can be derived from biomass and may end up in the soil to create more biomass. Hydrogen is derived from Mother Earth's biomass while the nitrogen comes from Mother Earth's atmosphere. Finally the bioammonia that is produced may be recycled back into Mother Earth's soil.

US Patent Application No. US 2006/0228284 A1 provides a process for producing ammonia using high pressure gasification to make syngas from a carbonaceous material. A quick analysis of the thermodynamic equilibrium shows that a significant amount of methane may be coproduced. This methane may be an undesirable component that can act as a reaction diluent in the ammonia loop, and can thereby result in a significant loss of efficiency.

Thus a need exists for an improved process for making ammonia from biomass. A further need exists to reduce the amount of methane in the biosyngas that may leave a gasifier during a process for making ammonia from biomass.

SUMMARY OF THE INVENTION

This invention provides a process for making ammonia from biomass. The biomass may be first reacted with oxygen and steam to generate a biosyngas comprising hydrogen ($H_2$) and carbon monoxide (CO) as the active components. The gasification step may be regulated to reduce the amount of methane, tars and benzene-toluene-xylene (BTX) in the biosyngas that may leave the gasifier.

The use of biomass as a starting feedstock may create the need for a process that may incorporate and integrate a sequence of special unit operations that may not be included in conventional processes for making ammonia:

The tars and benzene-toluene-xylene (BTX) contained in the biosyngas may be removed using an oxygen based autothermal reformer and the methane significantly reduced.

The hydrogen sulfide ($H_2S$) in the syngas leaving the gasifier may be maintained at a level ranging from 300-500 ppm. Maintenance at this level is conducted by introducing a small and appropriate amount of elemental sulfur into the gasifier. This hydrogen sulfide level may be necessary for maintaining the appropriate activity of the downstream water gas shift reactors.

The biosyngas (which may be free from tars and BTX) may still contain an appropriate level of $H_2S$ and may be subjected to a water gas shift (WGS) reaction, following which the carbon dioxide ($CO_2$), hydrogen sulfide ($H_2S$) and water may be removed from the gas mixture. The WGS operation may use staged adiabatic reactors with intermediate heat removal that can be specially designed to deal with a gas stream that contains more than 20% CO.

A final polishing step with a molecular sieve in a pressure swing adsorption mode may eliminate all inerts and parasites, and may yield a hydrogen stream with a purity of 99.9% or better.

The hydrogen can be combined with nitrogen (99.9% purity or better) and catalytically reacted to make the desired end product, i.e., ammonia.

The proposed process may also include a source of pure nitrogen. The process may include a cryogenic air liquefaction and separation unit that can provide a simultaneous supply of pure oxygen and pure nitrogen. The oxygen may be used as a reactant in the biomass gasifier, while the pure nitrogen can be fed into the ammonia synthesis reactor loop.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for making ammonia from biomass. Various aspects of the invention described herein may be applied to any of the particular applications set forth below or for other types of ammonia production systems. The invention may be applied as a standalone system or method, or as part of an application. It shall be understood that different aspects of the invention can be appreciated individually, collectively, or in combination with each other.

I. Overview

The proposed biomass-to-ammonia production facility may comprise (a) an air-separation plant that can produce high purity oxygen and nitrogen, (b) a design of an oxy-blown gasifier, (c) a gas clean-up stage, (d) a hydrogen gas enhancement stage comprised of a water gas shift step, plus hydrogen separation and compression, and (e) an ammonia formation stage that can catalytically combine the hydrogen and nitrogen. An example of the project is described further herein.

Figure 1:
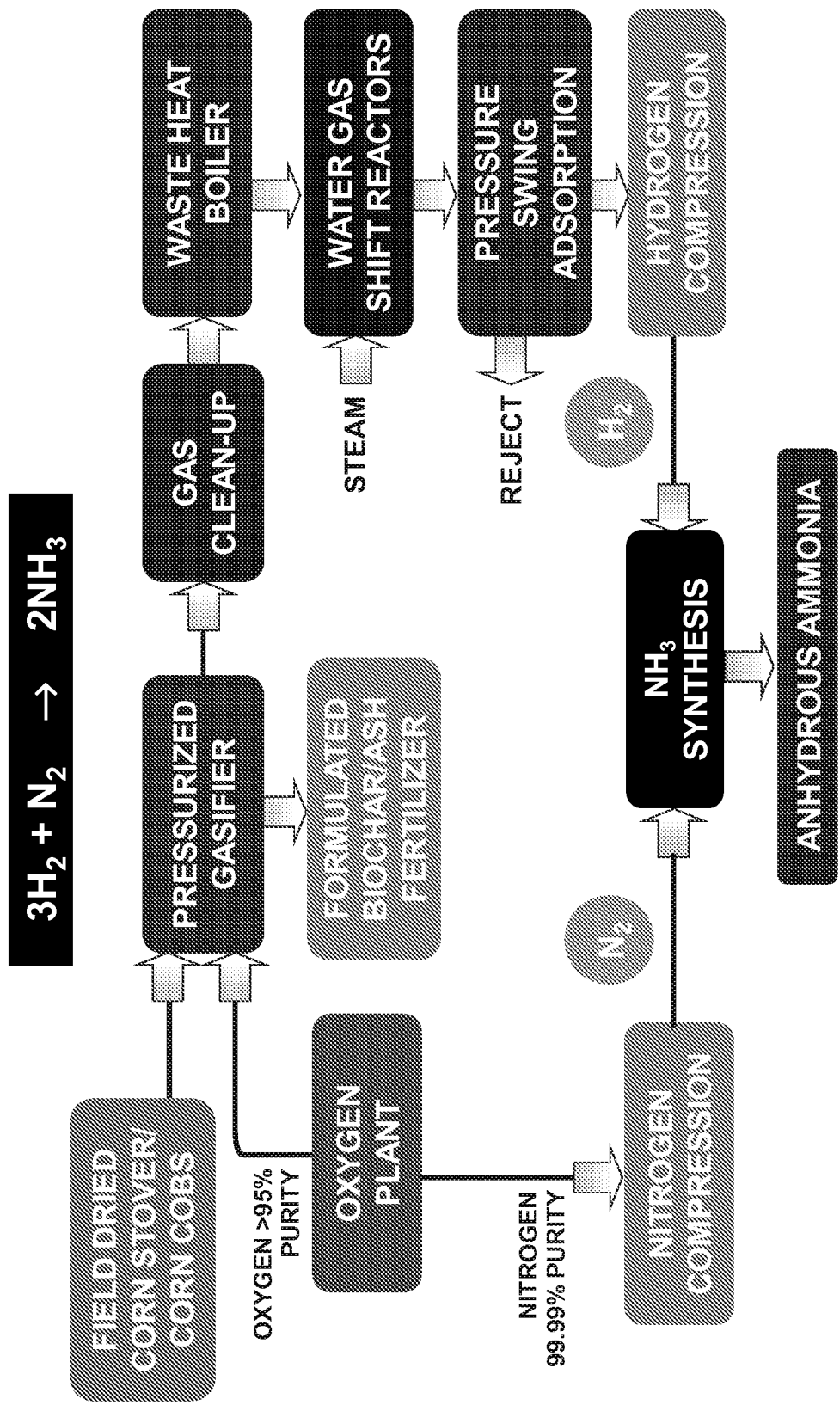
FIG. 1 is a block flow diagram that shows an integrated process to produce ammonia starting with the oxygasification of biomass.

FIG. 1 is a block flow diagram that shows an integrated process to produce ammonia starting with the oxygasification of biomass. The process may generally include a biomass fed into a pressurized biomass gasifier, which may include field dried corn stover or corn cobs, or any other biomass materials as described herein. The process may also include oxygen from an oxygen plant. In some instances, the oxygen may have any purity, such as 80% or greater, 85% or greater, 90% or greater, 95% or greater, 97% or greater, or 99% or greater purity. The oxygen may also be fed into the gasifier. The gasifier may produce a formulated biochar or ash, which may be used as it is or transformed into a fertilizer. The gasifier may also produce a biosyngas.

The biosyngas may be cleaned up. Various impurities may be removed from the biosyngas. In some instances, hydrogen from the biosyngas may be purified. Purified biosyngas may enter a waste heat boiler. Then the product from the waste heat boiler may be combined with steam in one or more water gas shift reactor. Then the product from the water gas shift reactor may be directed into a water cooled heat exchanger where the bulk of water vapor may be condensed, collected and purified for reuse as boiler feed water. Then the product may undergo compression, pressure swing adsorption, following which hydrogen compression may occur.

The oxygen plant which may provide oxygen to the biomass gasifier may also provide nitrogen. The nitrogen may have any purity, such as 85% or greater, 90% or greater, 95% or greater, 97% or greater, 99% or greater, 99.5% or greater, 99.7% or greater, 99.9% or greater, 99.95% or greater, or 99.99% or greater purity. The nitrogen from the oxygen plant may undergo nitrogen compression.

The hydrogen from hydrogen compression and the nitrogen from the nitrogen compression may be used in ammonia synthesis. The ammonia synthesis may yield an anhydrous ammonia.

Several key and/or exemplary design considerations for a biomass-to-ammonia production facility, system, or method may be included as follows:

Both oxygen, with a purity of >95%, and nitrogen, with a purity of at least 99.99% may be required. Other oxygen and/or nitrogen purities may be applied, as discussed further herein. Both specifications are readily attainable in the industry with cryogenic air separation units of the type specified for our process.

The $O_2$ may exit the air separation plant (aka oxygen plant) as vapor at or around 175 psig.

Dried biomass with approximately 10% moisture content may be gasified using oxygen and steam to yield a biosyngas that contains primarily carbon monoxide, hydrogen and carbon dioxide and may have some impurities. The equation for this reaction is:

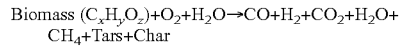

Biomass $(C_xH_yO_z)+O_2+H_2O \rightarrow CO+H_2+CO_2+H_2O+CH_4+Tars+Char$

In alternate embodiments, the biomass may have another moisture content, such as 15%, 20%, or 23%.

In a well designed oxyblown gasifier, it is possible to achieve hydrogen and CO concentrations of approximately 40% each. The gasifier may be deliberately designed to work under substoichiometric conditions whereby a portion of the biomass is left as char.

The biosyngas, along with the char and ash, may be directed through a two stage cyclone separation in which the majority of the solids can be removed and recovered as a product that can be sold as fertilizer and a soil conditioning agent.

The biosyngas leaving the cyclones may pass across an autothermal reformer where a small amount of oxygen is added for appropriate temperature control. The majority of the tar and benzene-toluene-xylene compounds (BTXs) may be reformed into their native components. In addition the entering methane concentration may be reduced, by reforming, to near its equilibrium concentration. In this stage, the gas may enter at or around 1750° F and exits at or around 1550° F.

The partially cleaned and reformed biosyngas may flow through a waste heat boiler at an inlet temperature of about 1550° F., and an outlet temperature of about 550° F. The waste heat boiler may be specially designed to eliminate any possible metal dusting issues. The presence of hydrogen sulfide in the gas also helps mitigate metal dusting. High pressure steam (600 psig) is generated in this boiler. The steam may be used for heat in the process and/or converted into electric power via a steam turbine generator set. The electric power may be used to drive the motor for the air compressor in the oxygen plant.

The cooled gas flows through a metal felt filter that functions as the secondary solids separation device. This filter system may be equipped with a pulse blowback that enables the residual solids to be recovered and mixed with the char-ash fertilizer.

Superheated steam may be injected into the biosyngas at this juncture. Even though the gas stream may be substantially above the dew point, this additional steam may be used or needed to optimize the subsequent downstream reactions.

For the production of ammonia, the production of hydrogen may be increased or maximized by conversion of carbon monoxide to hydrogen via the water gas shift reaction:

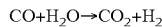

$$CO+H_2O \rightarrow CO_2+H_2$$

This reaction, when deployed with the appropriate catalyst, may convert over 90% of the CO to hydrogen and $CO_2$. As noted from the chemistry above, one mole of the CO will convert into an equimolar stream of $CO_2$. In this process, a water gas shift reaction is initiated at a temperature between 600 and 650° F. In alternate processes, the water gas shift reaction may be initiated at other temperatures. It should be noted that all the sulfur present in the feedstock may be still in the biosyngas as hydrogen sulfide. This may necessitate the use of a sulfur tolerant WGS catalyst. The catalyst may be deployed in two adiabatic reactors with a heat recovery boiler incorporated between these two reactors. This enables an optimal approach to equilibrium conditions to maximize or increase CO conversion. In the first adiabatic reactor, the gas may exit at about 850-900° F., go through the waste heat recovery boiler and enter the second adiabatic reactor at or around 400° F. Reaction products from the second adiabatic reactor leave at a temperature of around 500° F. thus enabling a CO concentration under 1.5 mol %.

The effluent from the second stage water gas shift reactor may be used to preheat the effluent from the first stage water gas shift reactor before it is directed through a cooler and into a water knockout system, thereby removing the majority of the water in the gas.

The cooled biosyngas may then be compressed to approximately 320 psig. The compressed gas, which is heated due to compression, may pass through another cooler and a small additional amount of water may be removed in a water knockout drum.

The compressed biosyngas can contain significant amounts of $H_2$, $CO_2$, CO, $CH_4$ and trace quantities of nitrogen, COS, ammonia, moisture and $H_2S$. These impurities may be removed by using pressure swing adsorption with molecular sieves that selectively adsorbs the impurities at pressures leaving hydrogen with a purity in excess of 99.99%. The impurities are subsequently desorbed from the molecular sieves by reducing pressure. The pressure swing adsorption (PSA) sequence has five basic steps: 1) adsorption, 2) concurrent depressurization, 3) countercurrent depressurization, 4) purge, and 5) countercurrent repressurization. The retentate or purge gas, consisting of all the impurities may be discharged at near atmospheric pressure into a system where they are routed to a boiler for combustion and energy recovery.

Ammonia synthesis catalyst is highly intolerant of $H_2S$. While the PSA operation removes the majority of $H_2S$, there may be some $H_2S$ slipping out of the PSA operation. Consequently, a zinc oxide guard bed may be incorporated downstream of the PSA unit to adsorb the $H_2S$ that slips by.

The pure hydrogen from the PSA unit and the pure nitrogen (argon free) from the cryogenic air separation plant may be blended and compressed to about 1200-1500 psig for supply to the ammonia synthesis.

The compressed ammonia synthesis gas mixture (>99.99% $H_2$ and >99.99% $N_2$) may be directed into an ammonia converter in which the catalytic reaction takes place. This converter may be a vertical vessel with three shallow radial flow beds that minimize or reduce pressure drop. There is appropriate influent-effluent heat interchange, inter-bed heat interchange and/or cold gas quenching to provide the appropriate operating conditions to maximize or increase ammonia conversion.

The hot gas exiting the converter may contain approximately 20% ammonia. The gas may be initially passed through a waste heat boiler to make low pressure steam and then cooled with cooling water and a refrigerant. Over 90% of the ammonia exiting the converter may be condensed at this point and sent to storage. The unconverted hydrogen and nitrogen and uncondensed ammonia can be sent back to the converter as a recycle system.

The anhydrous ammonia can be stored in refrigerated tanks (e.g., at −28° F.) at low pressure and made available for subsequent distribution.

Figure 2:
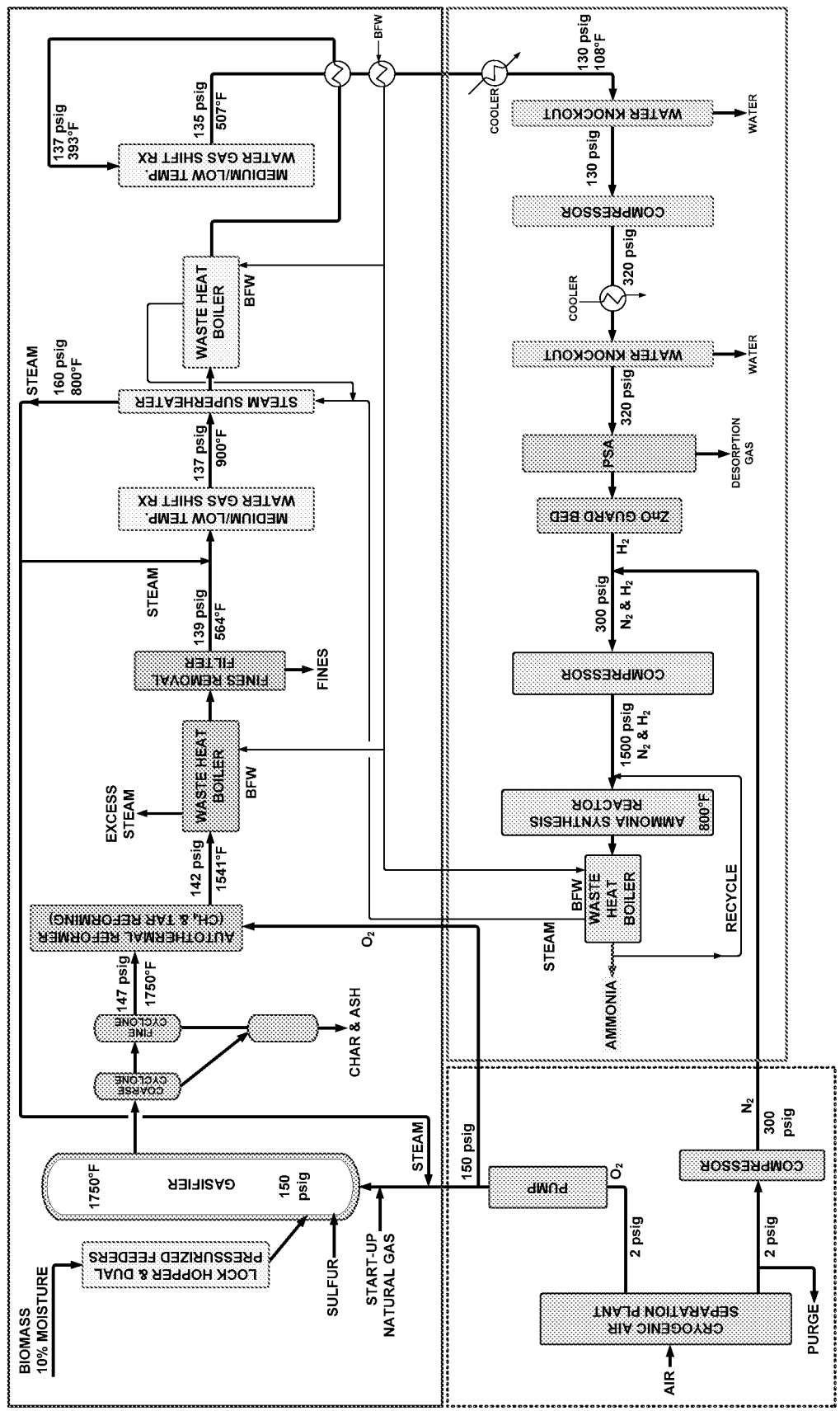
FIG. 2 is a flow schematic of a balanced integrated process for making ammonia from biomass and air as the two essential feedstocks.

A process flow schematic showing a balance integrated process for producing ammonia from biomass and air is shown in FIG. 2. Overall, the process may include gasifying a biomass to produce a biosyngas, purifying hydrogen from the biosyngas, and generating ammonia by combining hydrogen and nitrogen. In some instances, methane production in the biosyngas and end product may be reduced.

The biomass and air may be two feedstocks. The biomass may have a percentage moisture (e.g., 10%, 15%, 20%, 23%, 25%, 30% weight moisture). The biomass may be selected from the following: wood chips, corn stover, corn cobs, wheat straw, rice straw, switch grass, or any combination thereof. The biomass may enter a lock hopper and dual pressurized feeder to enter a gasifier. The biomass may enter any other mechanism that may assist with getting the biomass into the proper format and assist with feeding the biomass into the gasifier. The gasifier may include a fluidized bed to enhance gasification. The fluidized bed media may be comprised of olivine sand. Magnesia may be added into the olivine fluidized bed to getter a potassium component that may sometimes be present in the biomass.

A cryogenic air liquefaction and separation plant may provide oxygen to a pump or any other mechanism that may assist with providing oxygen to the gasifier. The oxygen may enter the pump at about 2 psig, although other pressures may be used. The oxygen may be compressed to about 75 psi to 250 psi. The oxygen from the pump may be coupled with a start-up natural gas which may assist with igniting the oxygen as or before it enters the gasifier.

In some embodiments, sulfur may also be provided to the gasifier. The amount of sulfur provided to the gasifier may be selected to be converted into a predetermined concentration of hydrogen sulfide ($H_2S$). The hydrogen sulfide level in the biosyngas may be maintained between 100 ppm to 1,000 ppm.

A biosyngas may be produced by the gasifier. The biosyngas may include hydrogen and carbon monoxide (CO) to a significant degree. The gasifier may be designed such that about 1%, 3%, 4%, 5%, 6%, 8%, or 10% of the biomass may remain as char. The biosyngas may enter one or more cyclones. One, two, three, four, or more cyclones may be provided. For example, two cyclones (a coarse cyclone and fine cyclone) may be provided. Char and ash may be collected and/or removed by the cyclones.

After the cyclones, the biosyngas may enter an autothermal reformer, where $CH_4$ and tar reforming may occur. Removal of tars and benzene-toluene-xylene (BTX) may be effected by oxygen-blown autothermal reforming. Oxygen may be provided to the autothermal reformer as well. In some instances, the source of the oxygen may be the cryogenic air separation plant. The autothermal reformer may include a catalyst comprising a noble metal. The autothermal reforming reaction may be conducted within a temperature range of 1450 to 1800 degrees F.

From the autothermal reformer, the biosyngas may enter a waste heat boiler. The waste heat boiler may be operated to eliminate or minimize metal dusting issues. The biosyngas exit temperature may be maintained between 850 to 700 degrees F. The waste heat boiler may receive steam from a steam source. Excess steam may leave the waste heat boiler.

The biosyngas may pass through a fines removal filter. Fines may be collected and/or removed from the biosyngas. Fines may include any residual smoky particles in the biosyngas. In some embodiments, the temperature of the biosyngas from the fines removal filter may be maintained between 550 and 700 degrees F.

A medium/low temperature water gas shift reaction may occur. In some embodiments, steam may be fed into the biosyngas after it has passes through a fines removal filter. In some instances, the production of additional hydrogen may comprise the water gas shift reaction. The water gas shift reaction may be conducted using a heterogeneous catalyst that may use the presence of hydrogen sulfide in the biosyngas to maintain catalytic activity. The reaction may be conducted in a two stage adiabatic configuration with heat recovery implemented between the two stages and after the second stage. The water gas shift reaction may be conducted at pressures ranging from 75 to 250 psig.

Following the water gas shift reaction, the heat of hydrogen rich biosyngas may be further recovered in boiler feed water heaters. The boiler feed water may come from a boiler feed water source. In some embodiments, the same boiler feed water source may be provided for each of the waste heat boilers in the system. In some embodiments, a plurality of water gas shift reactions may occur. For example, one, two, three, four, or more water gas shift reactions may occur in successive stages.

Hydrogen rich biosyngas may be subjected to a water knockout operation. Any water knockout techniques as known in the art may be utilized. The hydrogen rich biosyngas may also be compressed. In some instances, the gas may be compressed to pressures ranging from 150 psig to 600 psig. Any compression mechanism known in the art may be used. In some embodiments, compression of biosyngas may occur using an oil lubricated screw compressor. Any number of water knockout and compression stages may be utilized.

The biosyngas may also undergo pressure swing adsorption (PSA). The PSA may assist with purification of the hydrogen. During a PSA stage, desorption gas may be removed. Impurities may include one or more of the following: $CO_2$, CO, $CH_4$, $H_2O$, $N_2$, COS, $NH_3$ and $H_2S$. Further adsorption of these impurities may occur with countercurrent depressurization, purge and concurrent depressurization. In some instances, a ZnO guard bed may also be provided to further purify the gas. The product from the ZnO guard bed stage may be substantially purified hydrogen. For example, the hydrogen may be more than 90%, 95%, 97%, 99%, 99.9%, 99.95%, 99.99% or 99.999% pure. Thus, biosyngas from the gasifier may be substantially purified to hydrogen using one or more of the steps described herein.

The cryogenic air liquefaction and separation plant may also produce nitrogen. Alternatively, nitrogen may come from any other source. Nitrogen from the cryogenic air liquefaction and separation plant may pass through a compressor that may compress it from 2 psig to about 300 psig. Nitrogen may be provided at any other pressure value. The nitrogen may be greater than 80%, 95%, 90%, 95%, 97% or 99% pure. Such nitrogen may be substantially free of argon. The nitrogen from the plant may be fed in together with the purified hydrogen from the biosyngas. The mixed nitrogen and hydrogen may be further compressed. For instance, they may be compressed from 300 psig to about 800-2000 psig. For instance, they may be compressed to 1500 psig. Any compression mechanism known in the art may be used. In some embodiments, the nitrogen and hydrogen may be blended and compressed using an oil lubricated screw compressor.

The nitrogen and hydrogen may enter an ammonia synthesis reactor. The ammonia synthesis reactor may operate at about 800 degrees F. A waste heat boiler may also be provided, which may be in communication with the ammonia synthesis reactor. Product from a waste heat boiler may be further cooled to condense over 90% of the ammonia exiting the converter, the uncondensed ammonia and unconverted hydrogen and nitrogen may be recycled back into the ammonia synthesis reactor. The ammonia converter may provide an ammonia product. The ammonia may be anhydrous.

Any of the steps described herein may be optional or may be provided in a different order than described. Furthermore, additional steps may be included to produce the ammonia, which may include repeating any of the steps described.

In some embodiments, an aspect of the invention may be directed to a system for producing ammonia comprising a biomass gasifier configured to receive a biomass, wherein the biomass gasifier gasifies the biomass into a biosyngas. The system may also include an oxygen supply plant which provides oxygen to the biomass gasifier, one or more stages for purifying hydrogen from the biosyngas, and an ammonia converter that combines nitrogen from the oxygen supply plant and the purified hydrogen, thereby forming ammonia.

II. Cryogenic Oxygen & Nitrogen Production

The bioammonia process may require or utilize both oxygen (e.g., at >95% purity) for the biogasifier and nitrogen (e.g., at 99.99% purity) for the ammonia synthesis. Due to both the quantities and purities required or preferred for oxygen and nitrogen, a cost effective and reliable technology for producing the gases is cryogenic air separation. Cryogenic air separation is a well known process that has been employed successfully at a similar scale in many installations worldwide.

The cryogenic process makes use of low temperature distillation and relies upon the differences in boiling points in order to separate and purify the required products. Air is the only raw material, and electric power and cooling water are the only utilities required.

An exemplary process entails a series of operations as discussed below:

Atmospheric air passes through an intake filter, and is compressed to a maximum pressure (e.g., 375 psig) in a centrifugal compressor. After compression, it is cooled by cooling water. Alternatively, other cooling systems known or later developed in the art may be utilized. Condensed water may be removed in a high efficiency moisture separator.

Carbon dioxide and water are then removed by adsorption on molecular sieve in a two bed unit, one bed of which may be reactivated by waste gas while the other bed is in use.

The purified air passes through a pipeline filter, and is compressed to a higher pressure of (e.g., around 500 psig) by the booster compressor connected to the expansion turbine and enters the main exchanger. In alternate embodiments, other compressors or devices for increasing pressure may be utilized.

In the main exchanger, the air is cooled by heat exchange with the outgoing gaseous oxygen, gaseous nitrogen, and/or waste gas streams. The air may alternatively be cooled by any other heat exchanger with any other fluid or stream.

After passing through the upper section of the main exchanger, most of the air is expanded in the expansion turbine, thereby doing work and dropping in temperature. The work may be absorbed by a booster compressor on the other end of the turbine shaft acting as a brake.

The expanded air leaving the expansion turbine enters the bottom section of the lower column. The unexpanded portion of the air continues through the main exchanger, where it is partially liquefied. It then expands across a valve also into the bottom section of the lower column.

The lower column operates at a pressure of around 75 psig. As the vapor from the incoming air ascends the column, it may be in contact with liquid descending as reflux. This is a rectification process, with the vapor and liquid contacting each other. Due to the difference in boiling points of oxygen and nitrogen, as the vapor ascends it may become richer in nitrogen, and as the liquid descends it may become richer in oxygen.

At the top of the lower column, nitrogen vapor may be condensed by heat exchange with liquid oxygen in the bottom of the upper column. The oxygen is able to condense the nitrogen because it is at a lower pressure (e.g., of around 7 psig), compared to the pressure of nitrogen (e.g., around 70 psig).

Some of the condensed liquid nitrogen may be subcooled by heat exchange with the nitrogen rich vapor, and can pass to the top of the upper column, providing reflux. Another small part of the condensed liquid nitrogen may be withdrawn after subcooling and sent to storage for backup purposes. The remaining condensed liquid nitrogen can provide reflux for the lower column. Oxygen rich liquid may accumulate in the bottom of the lower column, and then it can be sub cooled in the subcooler and expanded into the upper column at an intermediate point.

In the upper column, as in the lower column, ascending vapor becomes richer in nitrogen, and descending liquid becomes richer in oxygen. As the liquid oxygen, which is in the bottom of the upper column, condenses; nitrogen in the lower column, it itself boils, and provides ascending vapor for the upper column.

Pure nitrogen (or substantially pure nitrogen) may leave from the top of the upper column and may be warmed in the main heat exchanger and is available as a nitrogen gaseous product, which can be compressed to a higher pressure. The pure nitrogen may also be warmed in any manner known in the art, such as utilizing other heat exchangers or heaters.

Nitrogen rich vapor may leave near the top of the upper column, and may be warmed in the main exchanger. Some of this nitrogen rich gas may be used for reactivation of the molecular sieve unit.

The liquid oxygen product may be withdrawn from the bottom of the upper column and can pass to the liquid oxygen pump or directly to storage. The liquid oxygen product may be compressed in the liquid oxygen pump. This liquid may then be vaporized by heat exchange with the incoming air, and may be available as high pressure gaseous oxygen product.

The air separation plant may be procured as a turnkey package from a qualified supplier.

For a typical plant that will be used to produce 150 tons per day of bioammonia, an air separation facility may be utilized as follows:

| | |
|---|---|
| Oxygen gas with a purity of >95.0% (min), 175 psig | 113,000 scfh (3,200 Nm$^3$/hr) |
| Nitrogen gas with a purity of >99.99% (min), 2 psig | 144,000 scfh (4,000 Nm$^3$/hr) |

In some embodiments of the invention, various steps or components described may be substituted with other steps or components that provide equivalent functions.

III. Biomass Feed Section

Figure 3:
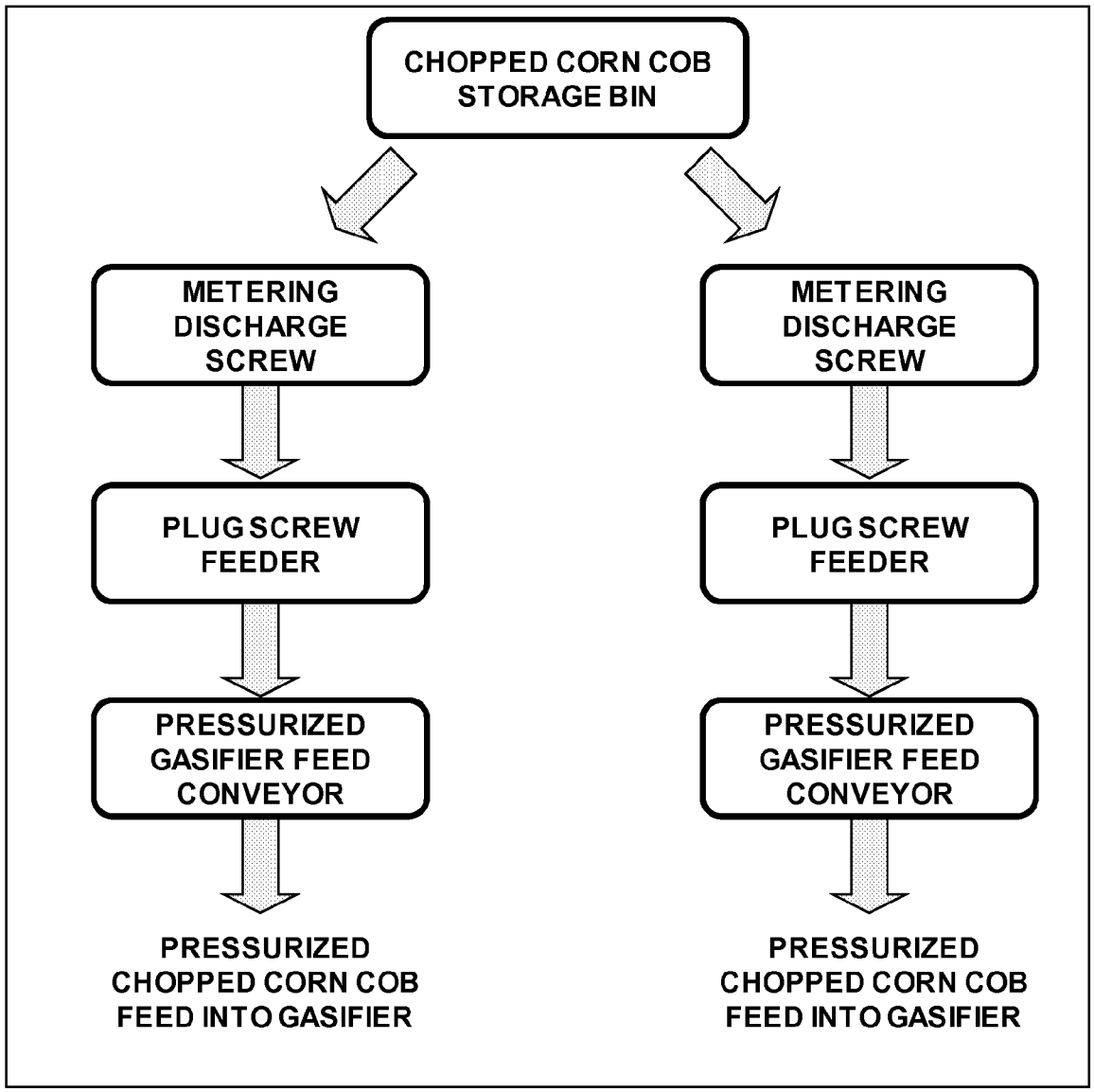
FIG. 3 is a block schematic for a method for feeding biomass into a pressurized gasifier.

FIG. 3 is a block schematic for a method for feeding biomass into a pressurized gasifier. A chopped corn cob storage bin may hold the biomass. The biomass may be provided to one or more metering discharge screw. From the discharge screw, the biomass may enter one or more plug screw feeder. Next, the biomass may enter a pressurized gasifier feed conveyor. The pressurized chopped corn cob feed (or any other biomass) may be fed into the gasifier. Thus, an example of a pressurized corn cob feed system may be provided. Further details may be provided herein.

Typically, different types of biomass can be fed into the pressurized gasifier. Each type of biomass may have an optimal preparation and feed strategy. Wood chips are the most commonly available feedstock but they may require a double lock hopper system with bang-bang ball valves connecting them. The lower lock hopper may typically be pressurized with $CO_2$ (this not only helps the equilibrium slightly but is also readily removable within the process) at a pressure which is slightly above the gasifier operating pressure. A screw feeder is generally used to convey the wood chips from the lower lock hopper into the gasifier.

Handling biomass such as corn stover, corn cobs, wheat straw, rice straw, switchgrass, may require a different handling protocol. In this case, additional work may have to be done in the preparation of the material prior to it being loaded into the upper lock hopper. Equipment is designed to take bales, run it through de-stringers and then grind/chop it down to 2" vertical size pieces. Modern state-of-the-art cubers can then take these materials and convert them into fuel cubes generally 1.25"×1" square with break off lengths ranging from 1-3 inches. The length is a function of the feedstock's bonding characteristics. This cubing technology is extremely useful because it can easily convert loose, low-density materials into dense fuel that is economic to transport and very efficient to gasify.

The plug-forming feeders comprise the group with significant commercial application and developmental activities in systems for the feeding of dry solids to processes operating at elevated pressure and current commercial application of the plug-forming feeders is strictly within the biomass industry.

Relative to any high-pressure biomass feeding system, the plug-screw feeder has had a very significant operating history and track record. The plug-screw feeder has also been utilized in two separate systems for feeding biomass to gasification systems.

Feed to these systems is accomplished via gravity in the case of corn cobs feeding and by vertical "stuffing" screws in the case of low-density wood fiber. After entering the feeder, the screw advances the corn cobs through the throat causing a densification force. The throat is equipped with a vent to allow moisture vapor and gas escape. After passing through the throat, the feed enters a cylindrical plug pipe where densification occurs. The resistance in the plug pipe to cause additional densification is provided by a device called the blow back damper. The acting end of the damper is conically shaped and rides on the face of the feed plug.

As the cantilevered screw extends to the end of the plug pipe, the biomass may exit with a "doughnut" shape. In case the plug loses its "integrity" (i.e., density), the resisting force of the blow back damper may be sufficient to compress the plug to the point where the damper closes against the plug pipe exit and seals against backflow of gas and steam. The damper may also function to break up the biomass plug.

The larger the feedstock, the better, concerning the ability to produce a plug with sufficient integrity to resist backflow of gas. An example of desirable corn cob feedstock is chopped corn cob ranging in size from ½ inch to 1 inch pieces.

At too small a particle size, the material could become too dense, and the feed would not have enough resistance to the shearing force required to move the material forward; instead, the material would spin with the screw.

The major unit operations of the system include 1) a pre-compression or stuffing screw; 2) a series arrangement of two plug-screw feeder/tee pipes, separated by a safety valve; and 3) a shredding conveyor for "delumping" of the material plug. Each tee pipe is equipped with a blow-back damper. A single line with 18" (457 mm) plug-screw feeders may be sufficient for 500 tons/hour. The shredding screw can decrepitate the plug fragments essentially back to the consistency of the as-fed material.

IV. Gasifier

The gasifier may represent a new method and process for converting biomass into biosynthesis gas (biosyngas), a mixture of gases that includes hydrogen ($H_2$) and carbon oxides (CO & $CO_2$), wherein the levels of methane ($CH_4$) and tars are minimized or limited in the composition of the end product. The input streams fed into the gasifier may include field or process dried biomass (8-25% moisture content), and controlled amounts of oxygen ($O_2$), steam ($H_2O$) and carbon dioxide ($CO_2$) as required. The chemistry of the desired reactions in the gasifier may be substantially enhanced by the oxygen inherent in biomass, and the gasifier design takes special advantage of this fact of nature. The chemical composition of a typical biomass feedstock in terms of carbon (C), oxygen ($O_2$) and hydrogen ($H_2$) is cited below:

Carbon: appr. 49 wt % (46 mol %), Oxygen: appr. 44 wt % (16 mol %), Hydrogen: appr. 7 wt % (38 mol %)

A typical equation for the conversion of biomass into biosyngas is:

$$C_{38}H_{52}O_{22} + 14.27H_2O + 13.01O_2 \rightarrow 27.57CO + 26.40H_2 + 10.43CO_2 + 13.87H_2O$$

The gasification may be conducted in a pressurized environment, preferably around 150 psig, and may make use of a single fluidized bed reactor that features progressively expanding beds with enabling transition zones, whereby the unique 3-zone geometry of the gasifier, may optimize the residence time within each zone, and may facilitate the kinetics of the underlying chemical reactions to yield the desired gas product. Depending upon location, temperatures within the gasifier can range from 1,450° F. to 2,000° F.

Biomass may be continuously introduced through a feed line into the reactive section of the gasifier. The biomass can be injected deep into this section, in order to minimize or limit the amount of methane, tars and other volatile components in the effluent. The oxygen and steam may be fed concurrently through a suitably designed burner or gas distribution system. The quantity of oxygen fed may be a function of the desired outlet temperature.

Ignition and initial heat-up actions in the gasifier may be facilitated by the addition of natural gas ($CH_4$) fuel. After ignition and start-up have been achieved, the oxygen feed line may be used to provide a flow of oxygen. Sometimes, supplemental steam and/or carbon dioxide may also be fed into the gasifier.

Tramp materials and unreactive components in the biomass flow downward may be collected in a catch pot at the bottom of the gasifier. A valve arrangement under the pot permits the discharge of its contents on a programmed or as-needed basis. Sensors or protocols may be utilized to aid in determining when discharge is to occur.

The gasifier may be configured as a progressively expanding vessel comprising multiple sections or stages, wherein each of the sections can perform its own special and sequential function to create the desired end product. In one embodiment, the three sections are a reactive section, a fluidized bed section, and a disengagement section.

There may be transition zones between the segmented stages. The transition zones can incorporate a configuration to accommodate the various cross-sectional areas of the stages. The transition zones may have truncated conical sections.

The products from the reactive section may expand and flow upwards into the fluidized bed section. The expansion may be modulated by a taper of a transition zone between these two sections. The fluidized bed section may have a greater cross sectional area than the reactive section.

The products leaving the reactive section can be subjected to intense mixing in the fluidized bed section. A preferable residence time is 10-15 seconds in the fluidized bed section. As the reactants fill up this section, they continue to expand and flow upwards into the disengagement section. Here again, the expansion may be modulated by a taper of the transition zone between the fluidized bed section and the disengagement section. The disengagement section may have a greater cross sectional area than the fluidized bed section.

A certain amount of fluidized bed activity may continue to take place in the lower part of the disengagement section. The fluidized bed activity in the disengagement section may be characterized by a dense phase that may be 2-3 feet in depth.

Partially reacted biomass that is carbonaceous in nature is referred to as char. Most of the char and inorganic ash that is entrained in the upper section of the fluidized bed may flow out along with the syngas into the primary cyclone. The char and ash may gravity-flow into a storage vessel equipped with a valve arrangement to discharge its contents on a programmed or as-needed basis.

A second cyclone, the fines cyclone, may be incorporated in the line downstream of the primary cyclone. This particular unit may be engineered to be able to remove a significant quantity of any particles still remaining in the syngas. The net result of having these two cyclones operating in a serial fashion is to produce a syngas that will probably still contain some sub micron sized fine particles commonly referred to as smoke.

The gasifier may be additionally equipped with an internal cyclone connected to a dipleg where the location has to be heuristically determined. The designs of the oxygen injection nozzles/steam ($CO_2$) shrouds may be based upon proprietary correlations. Specific bed heights may offer the optimal gas and solids residence times needed to attain the necessary conversion levels. The disengagement section may be designed with a generous height to minimize or limit any spill over of the olivine fluidizing media/cracking catalyst.

Finally, this design approach offers a significant benefit in terms of carbon management and sequestration. The gasifier may be deliberately operated in a substoichiometric mode that leaves 5-10% of the biomass feedstock in the form of a highly valuable char and inorganic mineral ash mixture, which when recovered, can be sold and recycled as a premium fertilizer and soil enhancement agent.

A typical output of gas produced at an operating temperature of 1,750° F. (gasifier) and 1,500-1,550° F. (autothermal reformer) is:

| | |
|---|---|
| $H_2$~vol (mol) | 34% |
| CO~vol (mol) | 31% |
| $CO_2$~vol (mol) | 15% |
| $H_2O$~vol (mol) | 18% |
| $CH_4$~vol (mol) | 2% |

Figure 4:
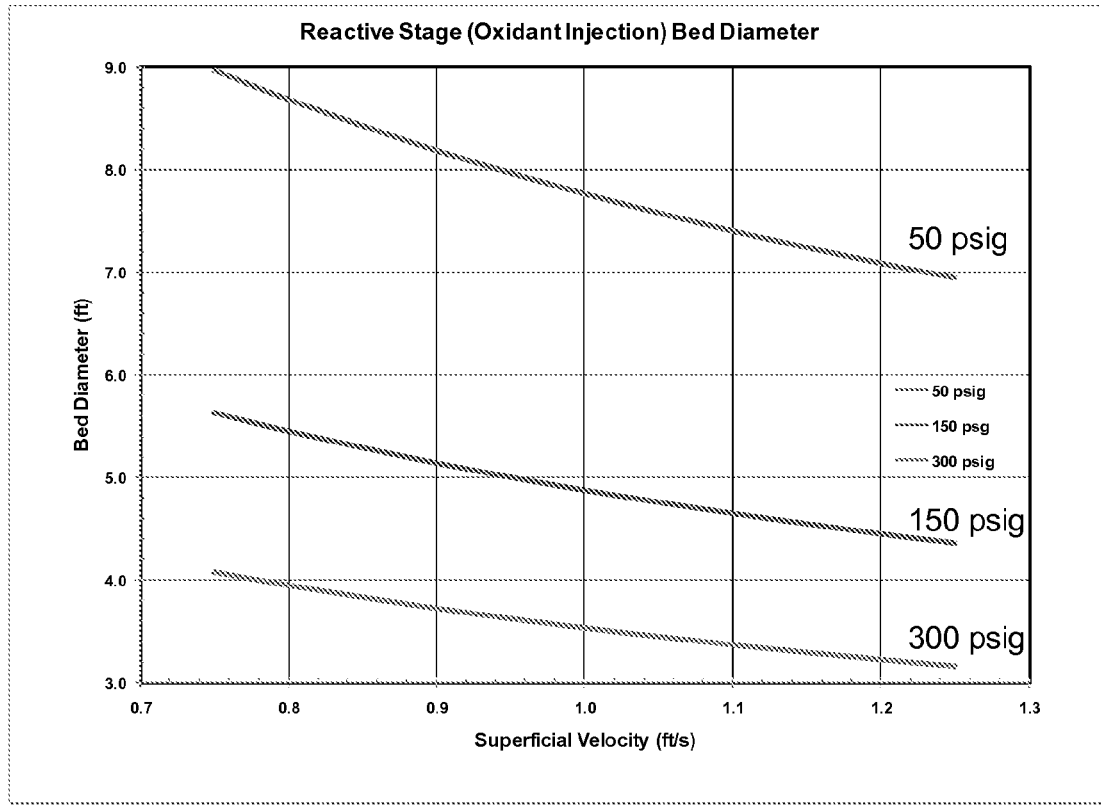
FIG. 4 is a graph that represents reactive stage bed diameters as a function of oxidant injection velocities for different pressures.
Figure 5:
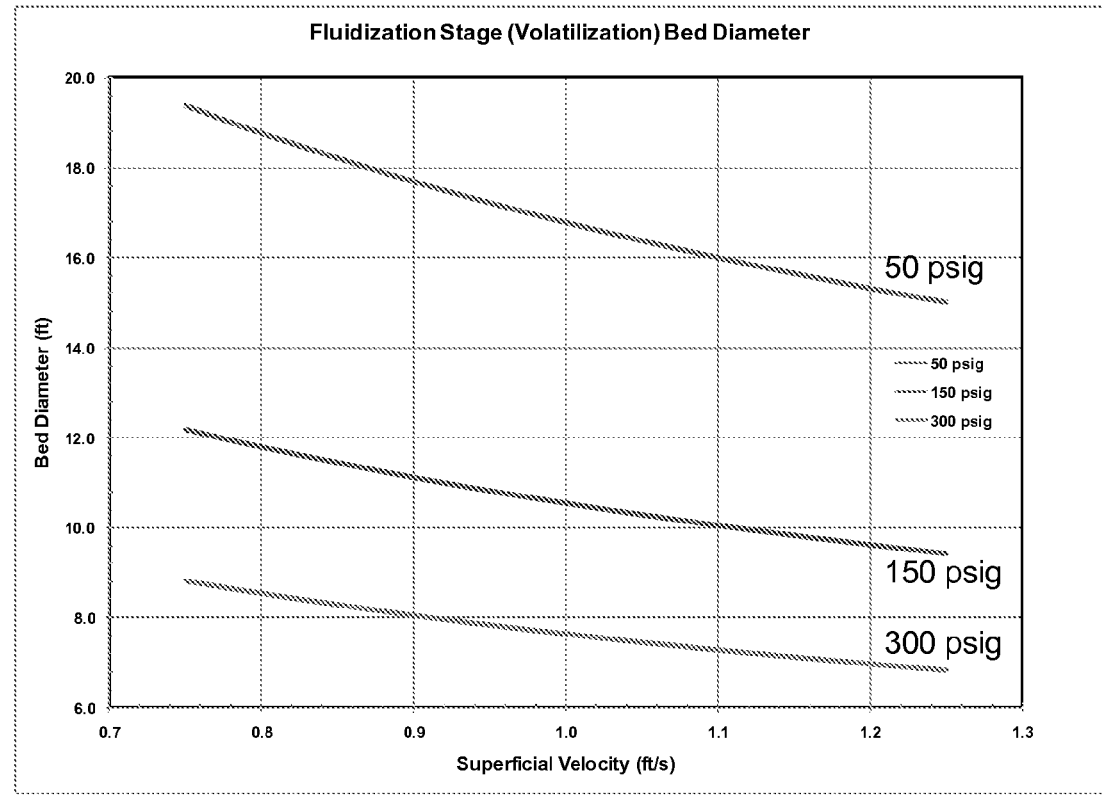
FIG. 5 is a graph that represents fluidization stage bed diameters as a function of reaction product velocities for different pressures.

An analysis of the bed diameter as a function of superficial velocity and operating pressure is presented below. FIG. 4 is a graph that represents reactive stage bed diameters as a function of oxidant injection velocities for different pressures (e.g., 50 psig, 150 psig, and 300 psig). FIG. 4 is pertinent to the reactive (oxidant injection) stage wherein the fluidizing gases are oxygen and steam. FIG. 5 is a graph that represents fluidization stage bed diameters as a function of reaction product velocities for different pressures (e.g., 50 psig, 150 psig, and 300 psig). FIG. 5 represents a condition where some of the oxidant has been depleted and the biomass feed (a highly reactive material) has been converted into gaseous products. This signifies a considerable increase in the total volume flow of gases in this section—the fluidization (volatilization) stage.

The addition of elemental sulfur into biomass feedstocks is a valuable protocol. The sulfur converts to $H_2S$ during the gasification step. The presence of $H_2S$ in the syngas stream mitigates metal dusting in the waste heat recovery boiler. Additionally, syngas produced from biomass gasification will typically contain $H_2S$ ranging from levels of 50 ppm to 200 ppm. This range of $H_2S$ cannot be handled by readily available water gas shift catalysts. It is required to remove the $H_2S$ to below 1 ppm or increase the level to 500 to 700 ppm to allow the use of "sour" shift catalysts. Adding sulfur to the gasifier is a cost effective and simple method for increasing the $H_2S$ content especially compared to the conventional technique of injecting DMDS into the syngas stream upstream of the water gas shift reactors.

Tar cracking: One of the major concerns in biomass gasification is the presence of tar and methane in the product gas. Tar is usually undesirable because it creates problems when it condenses, forms tar aerosols, or polymerizes to form more complex structures.

Tar is a complex mixture of condensable hydrocarbons that includes single ring to multiple ring aromatic compounds along with other oxygen containing hydrocarbons and complex polycyclic aromatic hydrocarbons. Tar is normally considered as a single lump of hydrocarbons. Significant efforts have been directed towards identifying all the constituent components of tar and the inter-connection between them. Several researchers have tried to put tars in different classes and are studying the relationship between these compounds.

Milne et al. at NREL classified tars into four different groups depending on reaction regimes. These four groups are: 'primary products' which are characterized by cellulose-derived, hemicellulose-derived and lignin-derived products; 'secondary products' which are characterized by phenolics and olefins; 'alkyl tertiary products' which are mainly methyl derivatives of aromatic compounds; 'condensed tertiary products' which are PAHs without substituent groups. Primary products are destroyed before the tertiary products appear.

In Europe, the tar classification system is: GC-undetectable tars (class 1: these are very heavy tars, cannot be detected by GC); heterocyclic compounds (class 2: tars containing heteroatoms; highly water soluble compounds); aromatic compounds (class 3: light hydrocarbons with single ring, do not pose a problem regarding condensability and solubility); light polyaromatic compounds (class 4: two and three ring compounds, condense at low temperature even at very low concentration); heavy polyaromatic compounds (class 5: larger than three rings, these components condense at high temperatures at low concentrations).

The tar dew point is the temperature at which the real total partial pressure of tar equals the saturation pressure of tar. Once the actual process temperature passes the thermodynamic tar dew point, the tar will condense.

Of all biomass tars, naphthalene, is one of the most stable in the temperature range of 1,350° F. to 1,650° F., and the formation of aromatic tar species without substituent groups, e.g. benzene, naphthalene, phenanthrene etc. is favored. Hydrocarbons without such a substituent group attached to the benzenoid ring structure are relatively stable. Decomposition of these hydrocarbons occurs at temperatures above 1,500° F., and naphthalene is observed to be the most stable. Naphthalene contributes a major part of the total tar product, even after severe catalytic treatment with dolomite and olivine at a very high temperature of 1,650° F.

Tar removal technologies can be broadly divided into two approaches: cracking and treatments inside the gasifier (primary methods), and hot gas cleaning downstream of the gasifier (secondary methods).

Olivine sand: Olivine is a naturally occurring material containing magnesium, iron oxide and silica. It offers much better abrasion resistance than dolomite. Olivine has excellent performance in terms of tar cracking and its activity is comparable to calcined dolomite: more than 90% reduction in average tar content.

Olivine is a nonporous material with an orthorhombic structure and an extremely low surface area. Its hardness makes it attractive as an in-bed additive for biomass gasifiers.

A typical composition of olivine is: MgO=49 wt %, $SiO_2$=41 wt %, $Fe_2O_3$=7 wt %, $Al_2O_3$=0.5 wt %, $Cr_2O_3$=0.3 wt %, NiO=0.3 wt %.

In olivine, iron is usually present as FeO; and its oxidation state can be changed to $Fe_2O_3$ by preheating with air. It is generally recognized that iron, as $Fe_2O_3$, is responsible for the tar cracking reactions.

Increasing the pretreatment time with air at high temperatures improves the activation properties of olivine. For example, the effect of pretreatment time of olivine up to 10 hours, showed significant improvement in the catalytic activity of olivine. Naphthalene conversion of more than 80% is observed, a significant improvement over untreated olivine.

Pretreatment of olivine with air at 1,650° F. improves its catalytic activity with a significant increase in naphthalene conversion.

A small amount of MgO must be added to the fresh olivine to avoid the formation of glass-like agglomerations that would result from the biomass potassium interacting with the silicate compounds. The MgO titrates the potassium in the feed ash. Without MgO addition, the potassium will form glass, $K_2SiO_4$, with the silica in the system. $K_2SiO_4$ has a low melting point (~2,370° F.) ternary eutectic with the silica, thus sequestering it. Potassium carry-over in the gasifier cyclones is also significantly reduced. The ash content of the feed may be assumed to contain 0.2 wt % potassium. The MgO flow rate can be set at two times the molar flow rate of potassium.

Gasifier shell and refractory: The gasifier shell may be made of high strength carbon steel. In the reactive section at the bottom of the gasifier, the carbon steel may be lined with a castable refractory that can handle a working temperature of up to 2,000° F., with the refractory thickness calculated to provide an external temperature of about 300° F., thereby allowing a controlled amount of heat to flow out radially. The reactive section with its castable refractory may be connected to the rest of the gasifier with flanges so that it can be occasionally pulled apart for maintenance and upkeep.

The two upper sections, the fluidized bed and the disengager may be lined with a spray-on refractory that may be easy to set up, and may not be subject to the hard duty required by the reactive section.

One aspect of the gasifier design includes the manner by which a biomass feedstock is introduced into the reactive stage/section. Unlike most other gasifiers, the solid feed need not be dumped through "a hole in the wall." Rather, biomass may be deliberately and carefully injected as close to the bottom of the reactive stage/section as possible, and such that the feed point is geometrically centered, or substantially geometrically centered. In alternate embodiments, biomass may be injected at any height along the reactive stage/section, or a desirable height may be selected according to gasifier properties.

In a high temperature environment, the deep injection strategy is more complicated than a simple "dump" approach, but greatly reduces the adverse wall effects that are commonly experienced with many other biomass gasifiers—both atmospheric and pressurized.

From a chemistry perspective, the deliberate and deep/centralized injection of the biomass into the reactive hot section also increases the decomposition of several pyrolysis products into the desired primary and secondary components.

Steam shroud may stabilize/enhance gasifier operation: Past experience with oxygen-blown gasifiers has shown that, unless properly managed, the oxygen flame can create some serious problems. This is more than ever true when the flame is surrounded by biomass that is continuously and simultaneously being consumed and replenished. If the flame is not adequately constrained, it may almost appear to have a temperamental mind of its own that can cause the flame front to change its angle and "dance."

The gasifier includes a design feature that may enable containment and management of the operation of the oxygen flame. The oxygen injection points may be protectively shrouded by the steam shrouds. Furthermore, the tip of the steam shroud can extend beyond the oxygen exit jet, thereby creating a blanket of steam around the flame that may provide a stabilizing effect, especially in the lower and more sensitive regions of the flame.

Design criteria & geometry: The following design criteria for the gasifier is shown below.

Biomass feed rate=402 tons per day=33,526 lbs/hr
Oxygen feed rate=109 tons per day=9,109 lbs/hr
Steam feed rate=300 tons per day=25,029 lbs/hr
Syngas produced=635 tons per day=52,952 lbs/hr
Fluidization velocity is calculated at gasifier temperature in that section
Maximum fluidization velocity in reactive & fluidization bed section=1 ft/sec
Maximum fluidization velocity in disengagement section=0.5 ft/sec
Oxygen jet velocity=100 ft/sec
Gas flow in the reaction section, actual cubic feet per second=20
Gas flow in the disengagement section, actual cubic feet per second=87
Height over diameter ratio in reactive & fluidized bed section=1
Height over diameter ratio in disengagement section=1.5
Calculated height and diameter of reactive section (3)=5'1"
Calculated height and diameter of fluidized bed section (4)=10'6"
Calculated diameter of disengagement section (5)=14'11"
Calculated height of disengagement section (5)=22'5"

Such design criteria may be provided by way of example, and values for various gasifier properties or operating conditions may be exchanged with other values.

Figure 6:
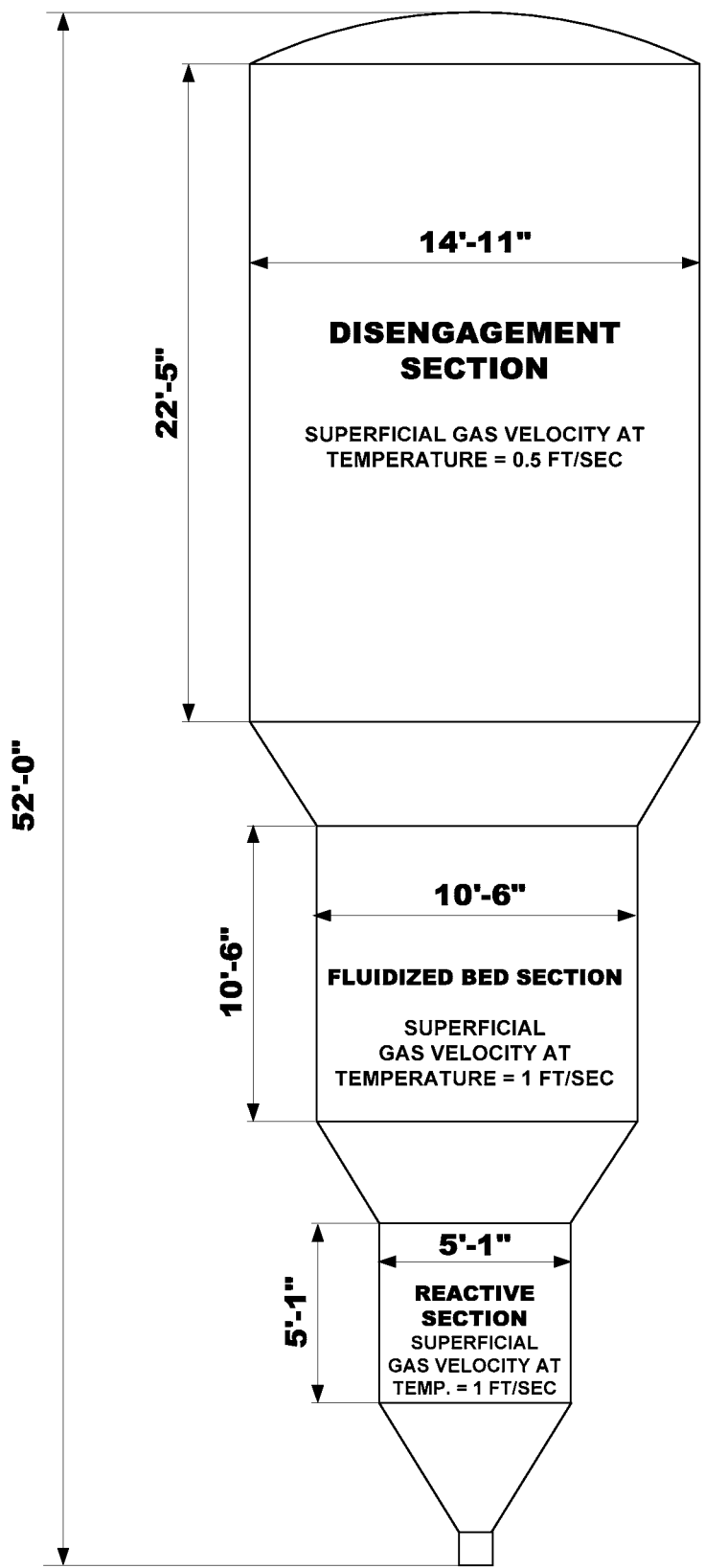
FIG. 6 is an outline of a pressurized fluidized bed gasifier indicating a set of designed criteria.

FIG. 6 is an outline of a pressurized fluidized bed gasifier indicating a set of design criteria. This gasifier is a multi-stage progressively expanding fluidized bed unit for the 150 TPD ammonia plant applications. Any dimensions or values included are provided by way of example only and are not limited to the gasifier configuration.

The gasifier may incorporate any characteristics, components, or features of other gasifiers. See, e.g., patent application Ser. No. 12/543,461, filed on Aug. 18, 2009, which is hereby incorporated by reference in its entirety.

V. Char-Ash Recovery in Cyclones

Particulate removal from the hot syngas exiting the gasifier may be conducted using two stage cyclone separators. Over 80% of char, ash and olivine fines may be separated in the primary cyclone. A secondary cyclone can be designed to remove 90% of any residual fines that would be still present in the hot syngas. The solids separated in the cyclones may be gravity dropped into a catch pot vessel that will occasionally blow out this material into drums. The materials in the drums may be constituted into fertilizer and returned back to the farmers.

The syngas leaving the two stage cyclone separators may still have a smoky characteristic due to the presence of sub micron sized particles composed primarily of fine ash and fine char.

VI. Gas Clean-up

The gasifier may be designed to minimize, decrease, or limit the formation of tars and benzene/toluene/xylene compounds. Yet it may still be necessary to remove much of remainder of these compounds to prevent fouling of downstream equipment.

A process for the simultaneous removal of tars and benzene/toluene/xylene (BTX) components, and for decreasing methane concentrations while optimizing energy efficiency has been developed. The method uses an oxyblown autothermal catalytic reformer for this purpose.

Figure 7:
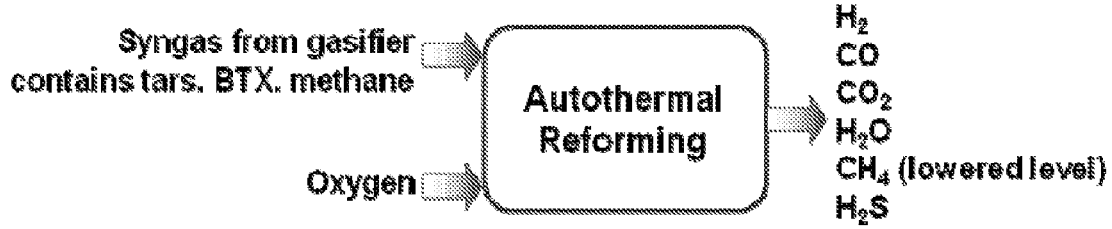
FIG. 7 is a schematic of an oxyblown autothermal reformer that mitigates tar, BTX and reduces methane.

FIG. 7 is a schematic of an oxyblown autothermal reformer that may mitigate tar and reduces methane. Syngas from the gasifier may contain tars, BTX, and methane. The syngas and oxygen may be provided to the autothermal reformer. The autothermal reforming process may yield $H_2$, $CO$, $CO_2$, $H_2O$, $CH_4$, and $H_2S$.

Autothermal reforming combines the heat effects of partial oxidation and steam reforming reactions by feeding the humid syngas and oxygen into the reformer. This process is carried out in the presence of a catalyst, which controls the reaction pathways and thereby determines the relative extents of the oxidation and steam reforming reactions. The presence of steam, oxygen and the use of an appropriate catalyst may enable lower temperature operation and greater product selectivity to favor the formation of $H_2$ and $CO$, while inhibiting the formation of coke (solid carbon).

The general autothermal reforming reaction is noted below.

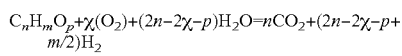

Lower temperature processing (compared to steam reforming and partial oxidation) favors the water gas shift reaction, which results in a higher selectivity for carbon dioxide and hydrogen.

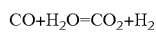

The catalytic partial oxidation reaction is exothermic in nature and the heat generated may be used to facilitate the steam reforming reaction that is endothermic. With the catalytic partial oxidation layer in intimate contact with the steam reforming catalyst layer, the process heat can be more effectively managed in an adiabatic mode (the autothermal reactor). In a preferable configuration, the thickness of the partial oxidation catalyst layer may be maximum or near maximum at the point of initial contact with the preheated inlet stream, and may be gradually reduced in thickness along the length of the monolithic substrate. Concurrently, the thickness of the steam reforming catalyst layer may be minimum or near minimum at the point of initial contact with the preheated inlet stream, and may be gradually increased along the axial length of the monolithic substrate.

Monolith substrates are often referred to as honeycombs and a preferable form may be made from a substantially inert rigid refractory material that is capable of maintaining its shape and mechanical properties at temperatures up to 2,050° F. Preferable materials may include special ceramics such as cordierite, a porous composition of alumina-magnesia-silica oxides or suitable high alloy metals. In these cordierite honeycomb monoliths, the gas flow passages are typically sized to provide 20 to 300 gas flow channels per square inch of face area to minimize, reduce, or limit pressure drop and still maintain an appropriate amount of catalytic surface area.

As noted earlier, the biosyngas leaving the cyclones may still contain small sub micron size particles. A further attribute of a honeycomb monolith substrate is the fact that smoky particles can flow through without impinging and accumulating on the catalyst. There is adequate linear velocity within the channels to eliminate this problem.

A series of simulations were conducted in order to demonstrate the effect of adding oxygen into the autothermal reformer, and the effluent temperature, gas composition and total quantity of hydrogen and carbon monoxide produced were studied. For each case, the gas composition shown below was assumed to enter the autothermal reformer at a temperature of 1750° F., a pressure of 150 psig and a molar flow rate of 2279 lb-mol/hr.

| COMPONENT | MOLE FRACTION |
|---|---|
| $CH_4$ | 0.0604 |
| $CO_2$ | 0.1610 |
| $CO$ | 0.2921 |
| $H_2O$ | 0.2168 |
| $H_2$ | 0.2667 |
| $N_2$ | 0.0022 |
| $H_2S$ | 0.0008 |

Figure 8:
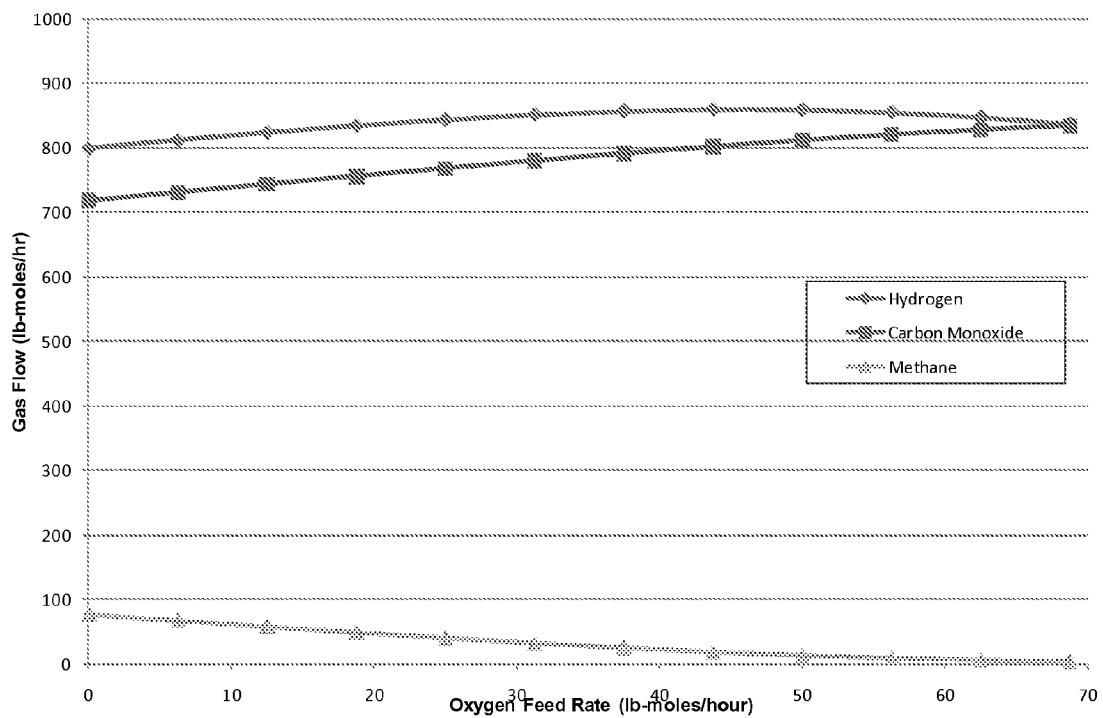
FIG. 8 is a graph that shows gas molar flows as a function of oxygen feed rate in an oxyblown autothermal reformer.

FIG. 8 shows an effect that increasing oxygen feed may have on the concentration of $H_2$, $CO$ and $CH_4$ in the effluent gas and upon the effluent gas temperature. In the case of zero oxygen, the methane composition (mole fraction) is reduced from 0.060 to 0.033, or about a 45% reduction, and the effluent temperature is 1510° F. In comparison, addition of 40 lb mol/hr of oxygen, reduces the methane mole fraction from 0.060 to about 0.009, an 85% reduction, and an outlet temperature of about 1630° F. In alternate embodiments, the addition of various amounts of oxygen may reduce the methane mole fraction by a 60% or greater, 70% or greater, 80% or greater, 83% or greater, 87% or greater, 90% or greater, 95% or greater, 97% or greater, 99% or greater reduction, or any other percentage reduction.

Figure 9:
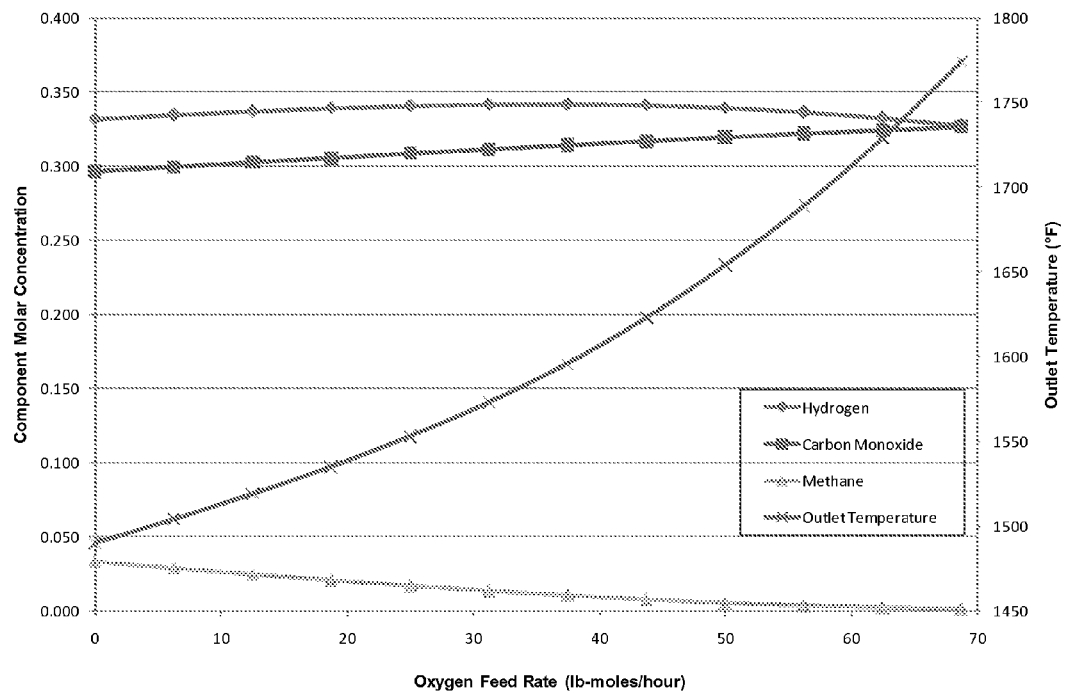
FIG. 9 is a graph that shows oxyblown autothermal reformer outlet component concentrations as a function of oxygen feed rate.

FIG. 9 shows the effect of increasing oxygen feed on the total moles of $H_2$, $CO$ and $CH_4$ in the system. The moles of $H_2$ and $CO$ combined may increase until their total reaches a peak at an oxygen addition rate of about 60 lb mol/hr.

VII. Waste Heat Recovery

The effluent gases may exit the oxyblown autothermal reformer at a temperature of 1500-1700° F., so this heat may be recovered by making use of a waste heat recovery boiler. A preferable design for this application may include a fire tube boiler in which the hot gases go through tubes surrounded by a water vessel. The equipment can be sized to reduce exit gas temperatures to the 500-600° F. range.

The syngas leaving the gasifier can create corrosion issues due to a phenomenon known as metal dusting. Metal dusting involves the disintegration of metals into small particles of metals, metal carbides, metal oxides and carbon. It is believed that the transfer of carbon from the gas phase to the metal or alloys plays a key part in metal dusting. High concentrations of carbon monoxide is the predominant cause of metal dusting, but hydrocarbons such as methane can also play a role. Metal dusting usually occurs at temperatures of above 700° F.

It has now been recognized that the presence of $H_2S$ in the syngas entering the waste heat boiler does minimize or decrease the possibility of metal dusting. It is convenient to have $H_2S$ levels in the range of 200 to 1,000 ppm.

In order to eliminate any problems associated with metal dusting, modern waste heat boilers are lined with castable refractory in the flow fields. This ensures that the hot syngas does not come into contact with the connecting flanges, pipes and boiler tube sheets. The boiler tube sheets may be protected with a facing of high purity bubble alumina. Ceramic or high alloy ferrules may be inserted into the metal boiler tubes to prevent the syngas from contacting the boiler tube metal. These ferrules may extend up to a point at which the temperature drops below 700° F. following which direct contact can be made with metal.

VIII. Separation of Solid Fines

Final solids in biosyngas separation: The gases leaving the waste heat boiler may flow into a final solids removal section in which the sub micron sized smoky particles are filtered out. Inline filtration using ceramic or metal felt fiber may be an effective process for this application.

After some time on stream, the differential pressure may increases as the solids are captured on the surface of the filter element resulting in the gradual formation of a filter cake. This stable surface cake may then become a de facto filter media. A $CO_2$ blowback may be used to replenish the filter at predetermined differential pressures.

The ceramic or metal filter elements may have porosities between 70 to 85%, providing high efficiency particle capture while maximizing or increasing flow rates and minimizing or reducing pressure drops. The system may be equipped with a venturi pulse blowback with a nozzle directed into each venturi. A manifold enables the blowback to take place in a pre-programmed sequential fashion. A fast acting valve may create a shockwave through the piping and nozzles, resulting in disengagement of the filter cake from the filter element, sending the cake into the bottom of the conical solids collection tank.

The blowback $CO_2$ pressure could be at least 20 to 80 psi above the system operating pressure, with a pulse duration between 0.25 to 0.5 seconds. In alternate embodiments, the blowback pressure may vary and have other values or durations. Blowback in the process may use carbon dioxide ($CO_2$) obtained from a downstream point. This ensures that no unnecessary inert such as nitrogen is introduced into the process biosyngas.

IX. Water Gas Shift

The syngas having gone through various unit operations for primary and secondary particulate removal, tar and BTX removal and methane reduction may then be ready for catalytic conversion to maximize or increase hydrogen content. The primary catalytic conversion reaction conducted at this stage may convert as much of the CO to hydrogen as is thermodynamically possible. This conversion is commonly referred to as the water gas shift reaction. This reaction removes most of the carbon monoxide and produces more hydrogen. Gas leaving the autothermal reformer will usually have up to 40% of its potential hydrogen in the form of carbon monoxide, which must then be "shifted" by reaction with steam to yield hydrogen and carbon dioxide.

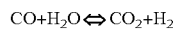

$$CO+H_2O \Leftrightarrow CO_2+H_2$$

The water gas shift reaction is exothermic. Low operating temperatures and high steam to carbon monoxide ratios favor the production of hydrogen. Under adiabatic conditions, conversion in a single bed is thermodynamically limited due to the temperature rise across the reactor. This limits the extent of conversion that can be achieved. This is typically overcome by multi-bed systems with cooling, either direct or indirect between the beds. In multi-bed systems, any number of beds may be utilized to produce the desired effect.

Figure 10:
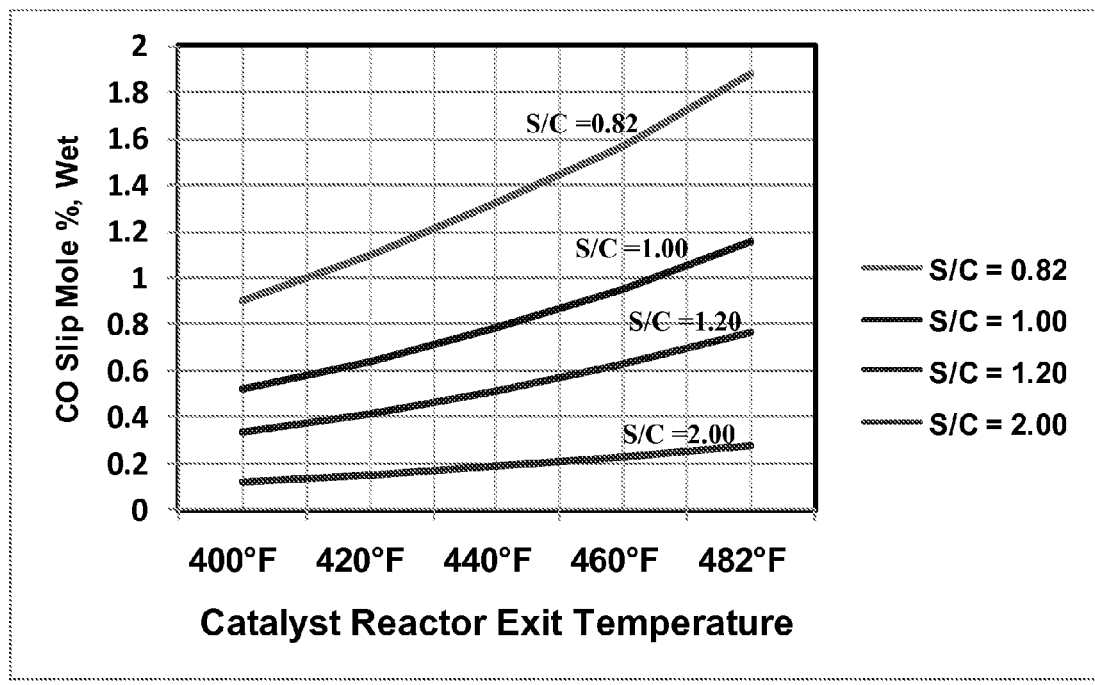
FIG. 10 presents an equilibrium CO slip over a low temperature water gas shift catalyst where the $H_2S$ containing biosyngas is the applicable feed stream.

FIG. 10 shows the equilibrium CO slip over water gas shift catalyst where biosyngas from biomass oxygasification is the feed stream.

Syngas from the biomass gasifiers may flow to the shift reactors contains $H_2S$. Conventional iron-chrome catalysts may not be preferable for this duty as $H_2S$ is a poison to the catalysts. For this application "sour" shift catalysts were developed. These catalysts achieve the maximum or increased activity in the sulfided state. Therefore, prior to start-up, they are treated with sulfur and can only be used in streams that contain sufficient sulfur to maintain them in this state.

The catalyst primarily comprises of cobalt oxide and molybdenum oxide with a potash promoter. The catalyst, when loaded, may preferably be carefully sulfided using the vendor recommended protocols. The sulfiding converts the cobalt oxide and molybdenum oxide into CoS and $MoS_2$ which are the active forms for this reaction.

Figure 11:
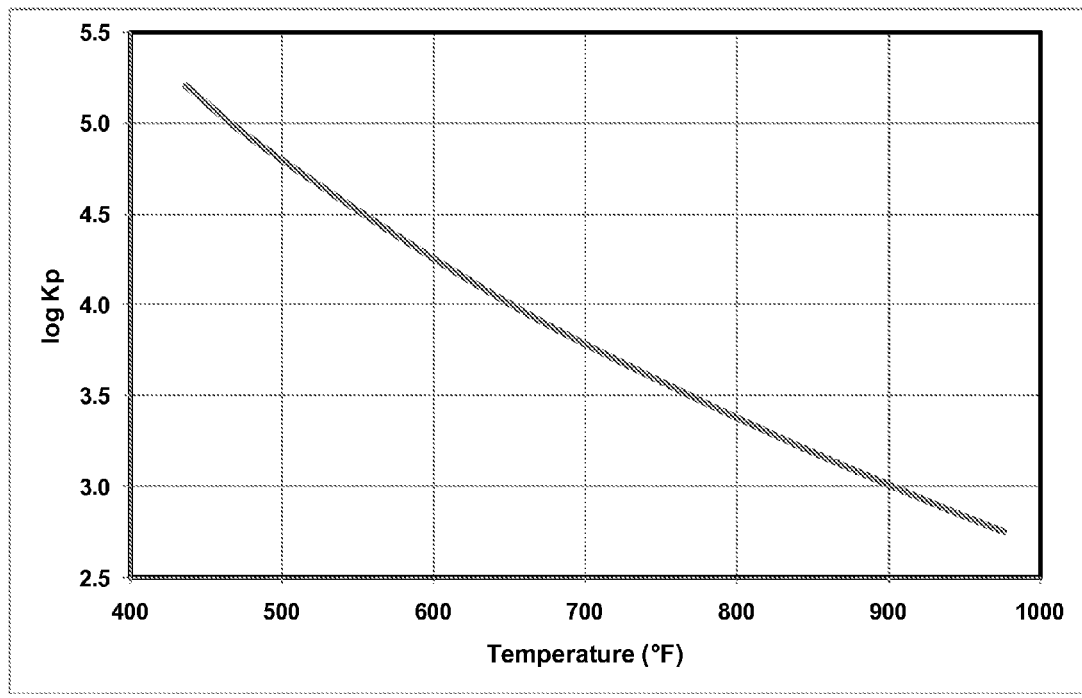
FIG. 11 shows the equilibrium constant for the $H_2S$ hydrolysis reaction (Kp) as a function of temperature.

It is essential that the catalyst remains in the sulfided state to maintain maximum or near maximum activity. The controlling factors are the ratio of steam to sulfur in the feed gas and the catalyst temperature, as shown below. The equilibrium constant for the hydrolysis reaction (Kp) is the ratio of the partial pressure of steam divided by the partial pressure of $H_2S$. FIG. 11 shows the equilibrium constant for the $H_2S$ hydrolysis reaction (Kp) as a function of temperature.

For example, a gas entering the water gas shift with an $H_2S$ concentration of 500 ppmv and a steam concentration of 0.40 will have a Kp value of 800 yielding a log Kp value of 2.9. Under these conditions, the water gas shift can be operated safely up to 900° F. and maintain the activity of the sulfided catalyst.

Higher concentrations of sulfur will not affect the catalyst activity. Increasing the steam content of the stream can also lead to desulfiding the catalyst. This could be considered particularly during shut-downs when the catalyst may be steamed to purge the vessel. It may be useful to substitute $CO_2$ or $N_2$ for purging since both may be readily available in this process.

Figure 12:
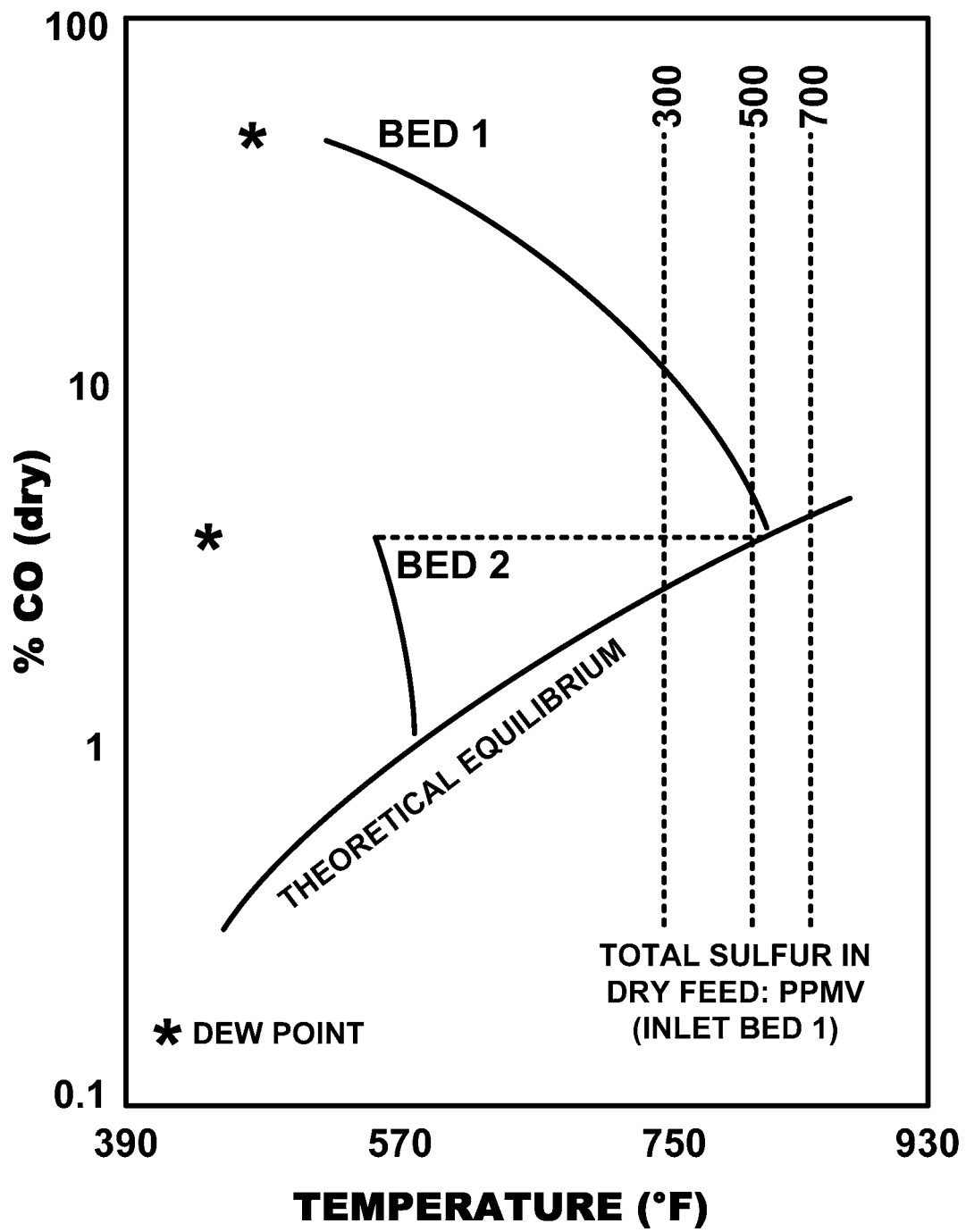
FIG. 12 shows the relationship between the sulfur in the feed, reactor bed temperature and the CO levels for a 2-stage adiabatic reactor system.

FIG. 12 shows a relationship between the sulfur in the feed, reactor bed temperature and the CO levels for a 2-stage adiabatic reactor system. The shown relationship is for a plant with two catalyst beds with heat exchange between them.

The stars (*) of FIG. 12 show the first boundary, which is the dew point for each of the beds. Inlet temperature to Bed 1 is 540° F. in this case. As the shift reaction proceeds, the temperature in the bed increases, and the CO content decreases until the secondary boundary, and the shift equilibrium line is almost reached (about 4 mol %).

At the exit of Bed 1 at a third boundary, the minimum sulfur content becomes important for low sulfur feeds: this is when the catalyst will start to hydrolyze and lose activity. In practice this only affects Bed 1 because the highest temperatures are recorded here.

The three parallel lines on the right hand side represent the sulfur concentration in the feed at which hydrolysis will occur and the catalyst starts to desulfurize.

In this case with an exit temperature of 825° F. a sulfur content of 550 ppmv or about 550 ppmv may be necessary or desirable to keep the catalyst in a sulfided state. Later in the catalyst's life, when the inlet temperature is raised to say 555° F. to maintain CO conversion, the exit temperature may rise correspondingly to 860° F. requiring a sulfur content of about 700 ppmv in the feed to keep the catalyst sulfided.

The gas exit Bed 1 may be cooled in a heat exchanger raising high pressure steam in the process and reducing the inlet temperature to Bed 2 to 555° F. The shift reaction may then proceed, reducing the CO content to around 1%. This bed may be operating at much lower temperature hence the sulfur requirement can be greatly reduced.

After cooling again the gas temperature may be reduced to 470° F., (the dew-point may limit further cooling).

Outlet temperatures of about 500° F. gives residual carbon monoxide concentrations around 1.0% (wet basis) at a steam to carbon ratio of 1.

Figure 13:
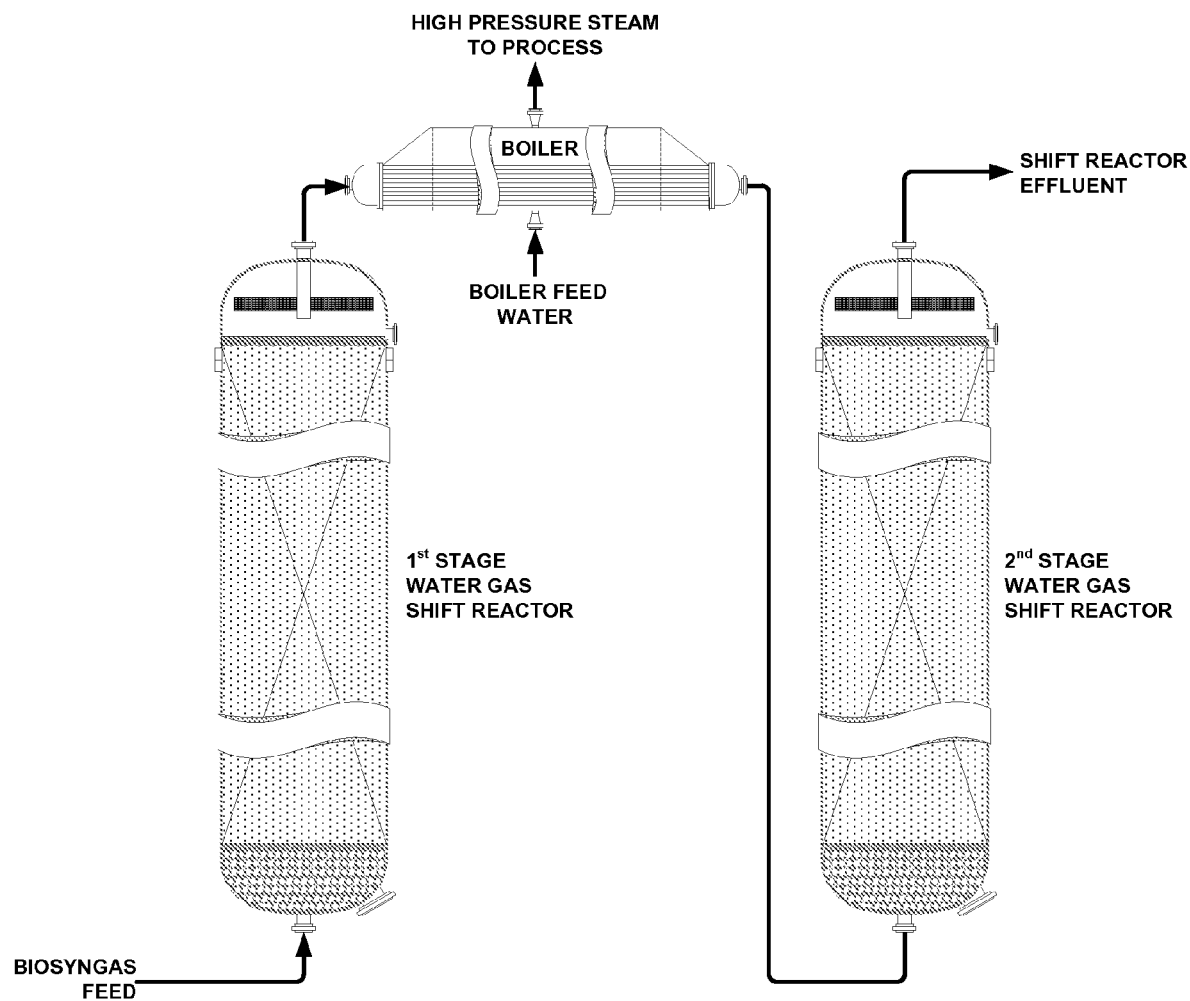
FIG. 13 is a schematic of a 2-stage adiabatic sulfur tolerant water gas shift reactor system.

FIG. 13 is a schematic of a 2-stage adiabatic sulfur tolerant water gas shift reactor system. A biosyngas feed may enter a first stage water gas shift reactor. Then the biosyngas may enter a boiler. The boiler may receive boiler feed water. High pressure steam may leave the boiler. After the boiler, the biosyngas may enter a second stage water gas shift reactor, thereby yielding a shift reactor effluent. Any number of water gas shift reactors may be provided with any number of boilers therebetween.

X. Water Knockout & Syngas Compression

The gas leaving the second bed of the water gas shift reactor may be hot (e.g., around 500° F.) and may contain a significant quantity of water vapor. The gas may be used to preheat the effluent from the first bed of the water gas shift reactor before it is directed into a water cooled heat exchanger where the bulk of the water vapor may be condensed, collected and purified for reuse as boiler feed water. The cooled gases may flow to a compressor at a pressure of around 130 psig. They may be compressed to an increased exit pressure (e.g., around 320 psig) which may be an optimum or desirable pressure for the production of >99.9% purity hydrogen needed or preferable for the ammonia synthesis loop. Preferable modern compressors developed for this application are referred to as screw compressors. In alternative embodiments, other compressors may be utilized.

Screw compressors are positive displacement machines in which rotating twin rotors act as pistons that compress the gas in a rotor chamber (casing). Compression is done continuously by the rotation of the twin rotors. There are also two types of screw compressors: the "oil-flooded" type with oil injection, and "oil-free" with no oil injection.

Screw compressors may be suitable or desirable for the following conditions:

On oil-flooded screw compressors, there is no mechanical limitation for pressure ratio. The only concern is efficiency.

Impact of molecular weight of gases—there is almost no impact of molecular weight of the gases upon the performance of an oil-flooded screw compressor. Injected oil is a sealant and leakage is controlled. Therefore these compressors are highly efficient for even the lowest molecular weight gases.

Availability—high reliability resulting in compressor availability may be the same as centrifugal machines and may allow single machine operation without a spare in critical services.

Compressor lubricant oil may be present in the process side, so the lube oil selection may be very different from other types of machines. The bulk of the oil may be separated in the primary oil separator, but a secondary coalescing oil separator may be used as an additional separator. Separation of oil is one of the important factors for oil-flooded screw compressors. Typically, a combination of demister mesh pad and coalescing elements are used. For example, 0.1 parts per million by weight (ppm wt) level can be achieved by combination of a demister mesh pad and two stages of coalescing elements. Charcoal absorbers are occasionally used for more severe applications. Borosilicate microfiber is a typical material used in coalescing elements and submicronic particles of oil can be separated from the compressed gas. Unlike reciprocating compressors, oil from the compressor has no deterioration by piston rubbing so oil can be recirculated in the system as lubricant for longer life.

Since compression is an adiabatic process, the gases may heat up significantly during this step. Exit gases from the compressor may be cooled down in another shell & tube heat exchanger set up in a vertical mode. Alternatively, the compressor may be cooled using other heat exchanger techniques or components, including a plate-type heat exchanger. This unit may be working at a higher pressure thereby enabling another fraction of water vapor to condense and let out of the system.

XI. PSA $H_2$ Purification

The compressed hydrogen rich and water vapor depleted syngas may primarily comprise >55% hydrogen and some levels of CO, $CO_2$, $CH_4$, $N_2$ and $H_2O$. This gas may be processed through a cyclic system that enables the production of >99.9% hydrogen while simultaneously stripping out all the other gases in the feed stream. These gases are depressurized out of the system and directed towards the fuel management part of the process. The unit operation for the production of pure hydrogen is referred to as Pressure Swing Adsorption (PSA).

The PSA process may involve the adsorption of impurities from a hydrogen rich feed gas onto a fixed bed of adsorbents at high pressure. The impurities are subsequently desorbed at low pressure into an offgas stream, thereby producing an extremely pure hydrogen product. In some embodiments, product purities in excess of 99.999% can be achieved.

No matter how complex the PSA sequence it can always be broken down into the following five fundamental steps.

Adsorption: Feed gas is passed co-currently through the clean adsorbent bed where impurities are selectively adsorbed. Pure hydrogen product at high pressure exits the bed.

Co-Current Depressurization: After adsorption the bed is saturated with impurities and requires regenerating. To recover hydrogen trapped in the void spaces, co-current depressurization passes hydrogen into repressurizing beds.

Counter-Current Depressurization: Final depressurization is counter-current and blows down impurities into the offgas stream.

Generally, PSA operation results in the loss of approximately 25% of $H_2$ that is present in the feed gas.

Purge: At low pressure, the bed is cleaned/regenerated using $N_2$ that is produced in the air separation unit. This protocol of using the $N_2$ purge reduces $H_2$ losses by about 50% of incoming hydrogen flow.

Counter-Current Pressurization: Low pressure $N_2$ is also employed to repressurize the bed to PSA operating pressures and optimizes efficiency and can be construed as free compression and reduces the load on the high pressure nitrogen compressors.

XII. Trim Desulfurization

Most biomass feedstocks contain various types of sulfur compounds that may result in parasitic production of hydrogen sulfide and carbonyl sulfides. The hydrogen sulfide and carbonyl sulfides present in the syngas may be allowed to flow into the sulfur tolerant water gas shift catalyst. In the entry section of that reactor, any carbonyl sulfide can be hydrolyzed into hydrogen sulfide. As noted earlier in the discussions of the sulfur tolerant WGS section, sulfur levels of around 500 ppm may be necessary to maintain activity of the WGS catalyst.

Over 98% of the hydrogen sulfide in the syngas leaving the WGS reactor may be adsorbed by the pressure swing adsorption operation. This hydrogen sulfide may be released along with the rest of the absorbents during the depressurization step.

There is approximately 5-10 ppm of $H_2S$ that could be leaving along with the hydrogen after the pressure swing adsorption operation. This may preferably be removed down to parts per billion levels to enable the hydrogen to be used as the co-feedstock in the ammonia synthesis reaction.

This is done satisfactorily and easily by passing this gas over a promoted ZnO bed where the $H_2S$ is quantitatively adsorbed.

$$ZnO + H_2S \rightarrow ZnS + H_2O$$

The sulfur rate is very dependent on temperature, porosity and surface area of the ZnO pellets. A normal service life for the catalyst bed may be typically designed to be over one year. Two beds are maintained in a parallel configuration with appropriate valving to be able to enable one bed at a time. Once the bed has been depleted—the ZnO may be converted to ZnS—the solids are taken out and sent to a landfill for appropriate disposal.

XIII. $N_2/H_2$ Compressor

The pure, (e.g., >99.9%), hydrogen stream from the PSA unit may be available at a pressure of around 300 psig. A stream of pure nitrogen from the air separation unit may also independently compressed to around 300 psig, and is blended into this hydrogen stream. The nitrogen-hydrogen stream may be blended in the appropriate stoichiometric proportion, namely three moles of hydrogen per mole of nitrogen. This appropriately blended stream may then be compressed to the appropriate pressure that may be required for optimal synthesis of ammonia. The pressures can be based upon the type of catalyst used in the ammonia synthesis and, in some cases, may vary from about 1100 psig up to 1800 psig.

The compressor for conducting this operation may be similar to the biosyngas compressor discussed earlier.

XIV. Ammonia Synthesis

The compressed stoichiometrically blended nitrogen-hydrogen stream may then flow into the ammonia synthesis loop.

Ammonia synthesis occurs between hydrogen and nitrogen over a solid catalyst.

$$N_2 + 3H_2 \Leftrightarrow 2NH_3 \quad \Delta H = -23,400 \text{ Btu/lbmol of ammonia formed}$$

This reaction is equilibrium limited, and within the temperature range in which the catalyst is active, pressures above 1100 psig are required to achieve reasonable conversions per pass. The reaction is strongly exothermic and under practical operating conditions, the reactor design must consider this heat removal.

The standard catalysts comprises iron with the addition of promoters and stabilizers, which increase its effectiveness and stability. Commercial ammonia synthesis catalysts are multi-promoted iron magnetite granules or multi-promoted iron wusterite granules. Traditionally the catalyst of choice is an iron-based catalyst with magnetite as its major component. In principle, any iron oxide would be a satisfactory precursor of a good ammonia synthesis catalyst, provided the promoters can form a solid solution in the oxide lattice. In practice, only magnetite, $Fe_3O_4$, is used to any great extent. An example of a catalyst that may be used is Johnson Matthey 74-2.

There are two key factors governing the formulation of a successful iron-based synthesis catalyst:
  the nature of the iron oxide used to prepare the catalyst before reduction
  the incorporation of promoters.

Both forms need to be, or are preferably, activated by reduction with either synthesis gas or pure hydrogen before use. Pre-reduced catalyst can be commissioned much faster than unreduced magnetite form.

Figure 14:
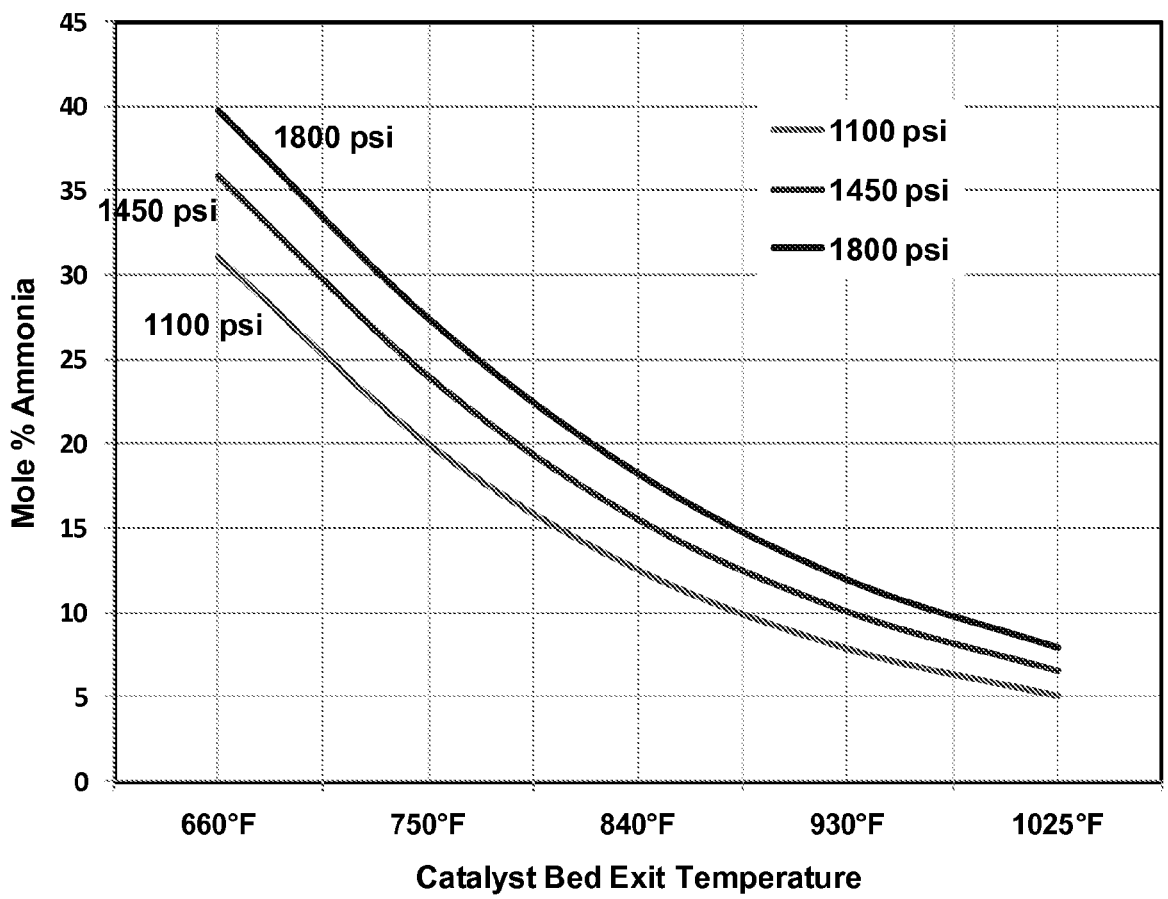
FIG. 14 shows a mole percent ammonia equilibrium as a function of catalyst bed exit temperatures for the hydrogen/nitrogen reaction system at different pressures.

FIG. 14 shows a mole percent ammonia equilibrium as a function of catalyst bed exit temperatures for the hydrogen/nitrogen reaction system at different pressures (e.g., 1100 psi, 1450 psi, 1800 psi).

Since the reaction is equilibrium limited, and strongly exothermic, conversion per pass is increased by allowing the reaction to take place in successive catalyst beds, arranged as two to four adiabatic conversion stages. In alternate embodiments, any number of successive catalyst beds may be provided, and any number of adiabatic conversion stages may be utilized. The principle of circulating gas over the catalyst in a loop system is an important feature of modern ammonia plants. Low pressure synthesis loops operating in the region of 1200-1800 psig have become an integral part of new technology. Some form of intercooling and/or quenching is applied between stages to allow the reaction to continue.

Almost all modern designs of ammonia reactors have switched to vertical vessel configuration using axial-radial flow catalytic beds. In these reactors, small granular catalyst is generally used in 2 or 3 axial-radial beds. This configuration has the advantage of low pressure drop and lends itself to inter-bed cooling using heat exchangers. An advantage of using indirect heat exchange over quenching is that it enables a more complete use of catalytic beds resulting in higher conversion yields and consequently, lower energy consumption. An advantage of using quenching is less complexity in the reactor design and a lower capital cost.

In the proposed reactor, the gas may flow from the inside towards the outside of the bed in the first catalyst section and from the outside towards the inside of the beds in the second and third catalyst sections. A heat exchanger may be located between the first and second catalyst beds and a cold gas quench may be injected between the second and third bed.

Synthesis gas of the appropriate composition may pass through the catalyst beds and the ammonia produced may be condensed and recovered. Unreacted gas and uncondensed ammonia, supplemented with fresh make-up gas, may be recirculated through the catalyst. The temperature of the recirculating gas may be raised to that required for reaction—about 650-750° F.—by heat exchange in the inter-bed exchanger and with the hot effluent gas.

Ammonia synthesis and water gas shift take place at a sufficiently high temperature to allow for the production of 800° F. and 175 psig steam in waste heat boilers. The reactor effluent passes through the waste heat boiler and may be cooled to about 370° F. The process stream may then be cooled as far as possible with cooling water, followed by heat exchange with the cold gas coming from the refrigerated section. Over 93% of the ammonia synthesized may be condensed and removed at this point leaving 6-7% ammonia in the circulating gas. The ammonia may be removed to receivers and let down in stages to release dissolved gases. Ammonia vapor that flashes off can be reliquefied in a refrigeration section for use as refrigerant and as product. Ammonia plants are usually designed to produce most of the product as liquid ammonia (e.g., at −28° F.), suitable for atmospheric pressure storage.

A variety of converter designs have been developed to control the temperature rise by means of cooling (tube cooled or inter-bed heat exchange) or addition of cold gas (quench). Careful control of the temperature profile through the ammonia synthesis converter is paramount if the optimum balance is to be achieved.

The source of iron for most catalysts is magnetite, $Fe_3O_4$, because of its crystal structure, which consists of a cubic packing of oxygen ions with iron ions distributed in the interstices. During reduction, oxygen may be removed from the crystal lattice without shrinkage to produce metallic iron that is extremely porous. The way in which the porosity is developed is an important factor affecting the activity of the final catalyst.

Iron remains the most cost-effective catalyst for the ammonia synthesis reaction because it is an inexpensive and abundant material, which forms strong and robust catalyst particles. Iron catalyst also has the advantage of very long life; in modern ammonia plants the catalyst life can easily reach 15 years and in some cases, catalyst replacement is governed by regulations for vessel inspections rather than by loss of catalyst performance. Although in alternate embodiments, other known catalysts may be used for the ammonia synthesis reaction, iron may be preferable.

Commercial iron-based catalysts incorporate several metal oxides within the magnetite structure that promote activity and improve stability of the operating catalyst. The most important of these are alumina and potash, which generate the so-called "doubly-promoted" catalyst. Several other oxides may also be added, for example calcium oxide, silica and magnesia. Promoters are classified as either "structural" or "electronic" depending on their mode of action.

Structural promoters such as alumina and magnesia may restrict the growth of iron crystallites during reduction and also during subsequent operation. They increase the thermal stability of the catalyst. The presence of alkali-metal species in ammonia synthesis catalyst may be essential to attain high activity. The alkali metals are "electronic" promoters and they may greatly increase the intrinsic activity of the iron particles. Potassium is the most cost-effective alkali-metal promoter. Thus, preferably potassium may be used, although other alkali-metal promoters in the art may be used.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of producing ammonia, the method comprising:
   (a) gasifying a biomass in a biomass gasifier to generate biosyngas, wherein said biomass is gasified with the aid of oxygen ($O_2$) supplied from an air separation unit in fluid communication with said biomass gasifier;
   (b) directing said biosyngas from said biomass gasifier to an oxyblown autothermal catalytic reformer downstream of said biomass gasifier, wherein said oxyblown autothermal catalytic reformer is operated at a temperature from about 1500° F. to 1700° F.;
   (c) reforming said biosyngas using said oxyblown autothermal catalytic reformer to provide a gas stream comprising hydrogen ($H_2$), wherein said gas stream has a substantially lower hydrocarbon content than said biosyngas;
   (d) directing said gas stream comprising hydrogen to an ammonia synthesis reactor; and
   (e) generating ammonia in said ammonia synthesis reactor by reacting hydrogen produced from said biosyngas with nitrogen supplied from said air separation unit.

2. The method of claim 1, wherein the biomass is selected from at least one member selected from the group consisting of the following: wood chips, corn stover, corn cobs, wheat straw, rice straw, and switchgrass.

3. The method of claim 1, wherein the biosyngas includes hydrogen and carbon monoxide (CO).

4. The method of claim 1, wherein the biomass gasifier is designed such that about 5% of the biomass remains as char.

5. The method of claim 1, wherein the oxygen is greater than 95% pure.

6. The method of claim 1, wherein the oxygen is compressed in a liquid oxygen pump to between about 75 psi and 250 psi.

7. The method of claim 1, wherein the biomass gasifier has a fluidized bed to enhance gasification.

8. The method of claim 7, wherein the fluidized bed media includes olivine sand.

9. The method of claim 7, further comprising adding magnesia into the fluidized bed, so as to getter a potassium component present in the biomass.

10. The method of claim 1, wherein elemental sulfur is added into the biomass gasifier and is converted into hydrogen sulfide, $H_2S$, at a concentration from about 100 ppm to 1000 ppm.

11. The method of claim 1, wherein (c) comprises removing tars and benzene-toluene-xylene (BTX) from said biosyngas.

12. The method of claim 11, wherein said tars and benzene-toluene-xylene (BTX) are removed from said biosyngas by said oxyblown autothermal catalytic reformer.

13. The method of claim 1, wherein the oxyblown autothermal catalytic reformer includes a sulfur tolerant catalyst.

14. The method of claim 1, wherein, in (c), the reforming is conducted using oxygen from the air separation unit.

15. A method of claim 1, further comprising purifying hydrogen from the biosyngas by removing impurities by pressure swing adsorption.

16. The method of claim 1, wherein heat within the biosyngas emanating from the biomass gasifier is substantially recovered in a waste heat boiler.

17. The method of claim 16, wherein the temperature of the biosyngas emanating from the waste heat boiler is maintained between 550° F. to 700° F.

18. The method of claim 1, wherein methane production in an end product of the biosyngas is reduced by 85% or more.

19. The method of claim 1, wherein, in (c), hydrogen in said gas stream is generated from said biosyngas by a water gas shift reaction.

20. The method of claim 1, wherein said oxyblown autothermal catalytic reformer is a two-stage adiabatic reactor.

21. The method of claim 1, wherein said oxyblown autothermal catalytic reformer comprises a catalyst containing cobalt and/or molybdenum.

22. The method of claim 1, wherein said catalyst further comprises sulfur.

23. The method of claim 1, wherein said oxyblown autothermal catalytic reformer is operated at a temperature from about 1500° F. to 1550° F.

24. The method of claim 5, wherein said nitrogen is at a purity of at least about 99.99%.

25. The method of claim 1, wherein said biomass gasifier is a multi-stage progressively expanding vessel comprising a fluidized bed section and a disengagement section.

26. The method of claim 1, wherein said oxyblown autothermal catalytic reformer comprises a partial oxidation catalyst and a steam reforming catalyst.

\* \* \* \* \*